United States Patent
Gutman et al.

(10) Patent No.: US 10,454,571 B2
(45) Date of Patent: Oct. 22, 2019

(54) DYNAMIC DETERMINATION OF THRESHOLD POWER LEVEL FOR USE IN DISTINGUISHING BETWEEN DOWNLINK AND UPLINK PERIODS IN TIME-DIVISION DUPLEXED (TDD) COMMUNICATIONS

(71) Applicant: Corning Optical Communications LLC, Hickory, NC (US)

(72) Inventors: Amit Gutman, Herzliya (IL); Guy Lupescu, Tel Aviv (IL)

(73) Assignee: Corning Optical Communications LLC, Charlotte, NC (US)

( * ) Notice: Subject to any disclaimer, the term of this patent is extended or adjusted under 35 U.S.C. 154(b) by 270 days.

(21) Appl. No.: 15/655,160

(22) Filed: Jul. 20, 2017

(65) Prior Publication Data
US 2019/0028187 A1    Jan. 24, 2019

(51) Int. Cl.
*H04B 7/26* (2006.01)
*H04W 52/24* (2009.01)
(Continued)

(52) U.S. Cl.
CPC ............. *H04B 7/2643* (2013.01); *H04B 1/44* (2013.01); *H04B 17/318* (2015.01); *H04L 5/1469* (2013.01); *H04W 52/24* (2013.01)

(58) Field of Classification Search
CPC ...... H04B 7/2643; H04B 17/318; H04B 1/44; H04L 5/1469; H04W 52/24
See application file for complete search history.

(56) References Cited

U.S. PATENT DOCUMENTS

| 2009/0092178 A1* | 4/2009 | Sayana | H04B 17/318 |
| | | | 375/227 |
| 2010/0041341 A1* | 2/2010 | Stratford | H04L 5/14 |
| | | | 455/67.14 |

(Continued)

FOREIGN PATENT DOCUMENTS

WO    2008076248 A1    6/2008

OTHER PUBLICATIONS

International Search Report and Written Opinion PCT/IL2018/050763 dated Oct. 25, 2018, 12 pgs.

*Primary Examiner* — Christopher M Crutchfield
*Assistant Examiner* — Tito Q Pham
(74) *Attorney, Agent, or Firm* — C. Keith Montgomery

(57) ABSTRACT

Dynamic determination of threshold power level for use in distinguishing between downlink and uplink periods in time-division duplexed (TDD) communications. For example, downlink and uplink periods may be distinguished in TDD communications in a distributed communications system (DCS), such as a distributed antenna system (DAS). Detecting a power level in a TDD communications signal less than the threshold power level is used to identify uplink periods in the TDD communications signal. In this manner, TDD communications circuits involved with transmitting TDD communications signals can synchronize their transmission circuitry to only transmit downlink TDD communications signals in downlink periods and receive uplink TDD communications signals in uplink periods. The threshold power level used to distinguish between downlink and uplink periods in a TDD communications signal can also be dynamically determined to avoid mistakenly identifying an uplink period during a true downlink period in the TDD communications signals.

22 Claims, 13 Drawing Sheets

(51) Int. Cl.
  *H04B 1/44* (2006.01)
  *H04L 5/14* (2006.01)
  *H04B 17/318* (2015.01)

(56) References Cited

U.S. PATENT DOCUMENTS

| | | |
|---|---|---|
| 2016/0088623 A1 | 3/2016 | Ben-Shlomo et al. |
| 2016/0173265 A1 | 6/2016 | Dadoun et al. |
| 2017/0094679 A1 | 3/2017 | Lupescu et al. |
| 2018/0027568 A1* | 1/2018 | Harada .................... H04J 11/00 370/230 |
| 2018/0302210 A1* | 10/2018 | Hedin .................. H04B 7/2656 |

* cited by examiner

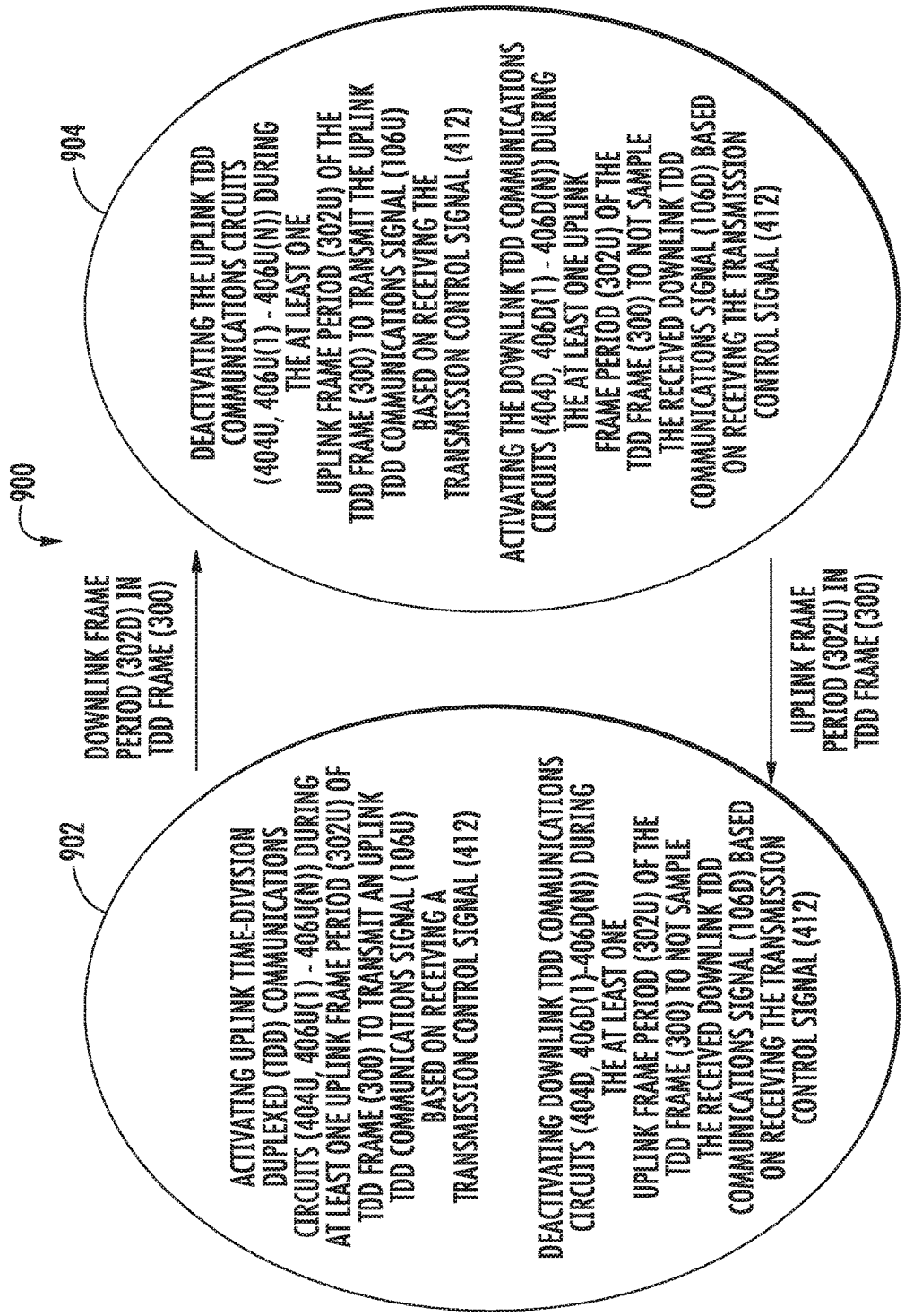

| Uplink/Downlink Configuration | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 11

DYNAMIC DETERMINATION OF THRESHOLD POWER LEVEL FOR USE IN DISTINGUISHING BETWEEN DOWNLINK AND UPLINK PERIODS IN TIME-DIVISION DUPLEXED (TDD) COMMUNICATIONS

BACKGROUND

The disclosure relates generally to time-division duplexed (TDD) communications, and more particularly to automated determination of threshold power level for use in distinguishing between downlink and uplink states in TDD configurations communications.

Wireless communications is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Time-division duplexed (TDD) communications is one type of wireless communications that is being employed for high-speed mobile communications. Known examples of TDD include Digital Enhanced Cordless Telecommunications (DECT) wireless telephony, and TD-code Division Multiple Access (CDMA) (TD-CDMA). TDD refers to providing duplex communications links whereby downlink communications signals are separated from uplink communications signals by the allocation of different time slots in the same frequency band. TDD allows both downlink and uplink communications transmissions to share the same transmission/communications medium. More specifically, TDD involves dividing a data stream into data frames and assigning different time slots to downlink and uplink communications transmissions. Users in a TDD communications system are allocated time slots for downlink transmissions and uplink transmissions. TDD also advantageously allows for asymmetric assignment and flow for uplink and downlink data transmissions in TDD data frames to provide for asymmetric (i.e., different) capacities or data rates between downlink communications and uplink communications depending on traffic and throughput considerations.

TDD can be employed in distributed communications systems (DCSs) to separate downlink communications signals from uplink communications signals by matching full duplex communications over a half-duplex communications link. For example, a DCS may be a distributed antenna system (DAS) that has a series of distributed antennas forming remote coverage areas for distributing downlink and uplink communications signals between a signal source and client devices. TDD DCSs communicate with TDD wireless devices called "clients," "client devices," or "wireless client devices," which must reside within the wireless range or "cell coverage area" in order to communicate with an access point device. TDD DCSs may be particularly useful to be deployed inside buildings or other indoor environments where TDD client devices may not otherwise be able to effectively receive radio-frequency (RF) signals from a source, such as a base station for example. Exemplary applications wherein TDD DCSs can be used to provide or enhance coverage for wireless services include public safety, cellular telephony, wireless local access networks (LANs), location tracking, and medical telemetry inside buildings and over campuses.

One approach to deploying a TDD DCS involves the use of RF antenna coverage areas, also referred to as "antenna coverage areas." Antenna coverage areas can be formed by remotely distributed antenna units, also referred to as "remote units (RUs)." The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

In TDD DCSs where data is transferred in sequential synchronized radio frames, it may be required to determine periods when downlink communications signals and uplink communications signals are being transmitted in a given time slot in the TDD frame since TDD allows both downlink and uplink communications transmissions to share the same transmission/communications medium. Transmitter and receiver circuits in such a TDD DCS must be synchronized to these downlink communications signal and uplink communications signal periods so that downlink communications signals are not transmitted when uplink communications signals are present on the communications medium, and vice versa. In other words, the radio frame structure is known to TDD communications devices in the TDD DCS. Such TDD communications devices know when uplink communications messages can be sent and when uplink communications messages should not be sent to receive downlink communications signals. Otherwise, data losses can occur when downlink communications signals are not received when uplink communications signals are being transmitted. "Back-off" collision detection and avoidance systems can be employed to wait for a defined period of time until the communications medium is clear of uplink communications signals before asserting new downlink communications signals on the communications medium. However, throughput would be reduced to half-duplex as a result. Collision detection and management mechanisms may also add design complexity, thereby increasing cost by requiring additional components, and requiring additional area on electronic boards.

No admission is made that any reference cited herein constitutes prior art. Applicant expressly reserves the right to challenge the accuracy and pertinency of any cited documents.

SUMMARY

Embodiments disclosed herein include dynamic determination of threshold power level for use in distinguishing between downlink and uplink periods in time-division duplexed (TDD) communications. The threshold power level could be used, for example, in distinguishing between downlink and uplink periods in a TDD distributed communications system (DCS). The DCS may be a distributed antenna system (DAS) as a non-limiting example. In TDD communications, data is transferred on a common communications medium in radio frames that include pre-determined downlink periods (i.e., time slots) for transmission of downlink data and uplink periods for receiving uplink data. If downlink data is transmitted over the communications medium in an uplink period or vice versa, data loss may occur as a result of data collisions. Thus, in embodiments disclosed herein, the power level of a TDD communications signal is monitored and compared against a threshold power level. It is known that the power level of a TDD communications signal is lower during uplink periods of the radio frame and higher during downlink periods of the radio frame. Detecting a power level in a TDD communications signal less than the threshold power level is used to identify uplink periods in the TDD communications signal. In this manner, TDD communications circuits involved with transmitting TDD communications signals can synchronize their transmission circuitry to only transmit downlink TDD communications signals in downlink periods and receive uplink TDD communications signals in uplink periods. Noise present in a TDD communications signal during uplink periods can increase power in the TDD communications signal during such uplink periods. Also, data being absent during particular downlink periods in a TDD communications signal can cause the power in the TDD communications signal to be reduced during such downlink periods. If the threshold power level used to distinguish between downlink and uplink periods in a TDD communications signal is permanently set to static power level that is below the power level during uplink periods when noise is present, a true uplink period in the TDD communications signal may be detected as a downlink period. Similarly, if the threshold power level is permanently set to a static power level that is above the power level during downlink periods with reduced or absent data transmissions, a true downlink period in the TDD communications signal may be detected as an uplink period.

Thus, in exemplary embodiments disclosed herein, the threshold power level used to distinguish between downlink and uplink periods in a TDD communications signal can be dynamically determined to avoid mistakenly identifying an uplink period during a true downlink period in the TDD communications signals, or vice versa. In this regard, a power detector circuit is provided that detects the power level in a TDD communications signal and generates a power level signal indicating the detected power level in the TDD communications signal. The power level signal is sampled at a sampling rate into a plurality of power level samples. The sampling rate may be faster than a symbol rate in a radio frame of the TDD communications signal. The power level samples are divided into a plurality of power level sample blocks. The average power level of each power level sample block is determined. The power level sample block with the lower average power level is known to contain power level samples from an uplink period (e.g., an uplink sub-frame) of the TDD communications signal. If the number of power level sample blocks is at least twice the number of sub-frames in the TDD communications signal, the power level sample block with the lower average power level is known to exclusively contain power level samples from an uplink period of the TDD communications signal. The threshold power level for distinguishing between downlink and uplink periods in a TDD communications signal is then dynamically set based on the determined power level in a power level sample block determined to have a lower average power. In this manner, as an example, the determined threshold power level can be used to distinguish between downlink and uplink periods in a TDD communications signals.

One exemplary embodiment of the disclosure relates to a TDD detection circuit. The TDD detection circuit comprises a power detector circuit. The power detector circuit is configured to detect a power level in a TDD communications signal. The power detector circuit is also configured to generate a power level signal indicating the detected power level in the TDD communications signal. The TDD detection circuit also comprises a processing circuit. The processing circuit is configured to sample the power level signal at a sampling rate into a plurality of power level samples. The processing circuit is also configured to divide the plurality of power level samples into a plurality of power level sample blocks. The processing circuit is also configured to determine an average power level in each of the plurality of power level sample blocks. The processing circuit is also configured to determine a power level sample block among the plurality of power level sample blocks having a lowest average power level. The processing circuit is also configured to generate a threshold power level signal indicating a threshold power level based on the average power level in the power level sample block determined to have the lowest average power level.

An additional exemplary embodiment of the disclosure relates to a method of determining a threshold power level for distinguishing between downlink and uplink periods in a time-division duplexed (TDD) communications signal. The method comprises generating a power level signal indicating a detected power level in the TDD communications signal. The method also comprises sampling the power level signal at a sampling rate into a plurality of power level samples. The method also comprises dividing the plurality of power level samples into a plurality of power level sample blocks. The method also comprises determining an average power level in each of the plurality of power level sample blocks. The method also comprises determining a power level sample block among the plurality of power level sample blocks having a lowest average power level. The method also comprises generating a threshold power level signal indicating a threshold power level based on the average power level in the power level sample block determined to have the lowest average power level.

An additional exemplary embodiment of the disclosure relates to a TDD communications circuit. The TDD communications circuit comprises a downlink TDD communications circuit configured to distribute a received downlink TDD communications signal for a TDD communications session over a communications medium in response to a transmission control signal indicating a downlink period in the TDD communications session. The TDD communications circuit also comprises an uplink TDD communications circuit configured to distribute a received uplink TDD communications signal for the TDD communications session over the communications medium in response to the transmission control signal indicating an uplink period in the TDD communications session. The TDD communications circuit also comprises a TDD detection circuit. The TDD detection circuit comprises a power detector circuit. The power detector circuit is configured to detect a power level in the downlink TDD communications signal and generate a power level signal indicating the detected power level in the downlink TDD communications signal. The TDD detection circuit also comprises a processing circuit configured to generate a threshold power level signal indicating a threshold power level based on a determined lowest average power level in the power level signal. The TDD communications circuit also comprises a TDD period control circuit. The TDD period control circuit is configured to compare the detected power level in the downlink TDD communications signal to the threshold power level. The TDD period control circuit is also configured to generate the transmission control signal indicating the downlink period in response to the detected power level being higher than the threshold power level. The TDD period control circuit is also configured to generate the transmission control signal indicating the uplink period in response to the detected power level being lower than the threshold power level.

An additional exemplary embodiment of the disclosure relates to a TDD distributed communications system (DCS). The TDD DCS comprises a central unit configured to distribute received downlink TDD communications signals from at least one TDD signal source over at least one communications medium to a plurality of remote units, and distribute received uplink TDD communications signals over the at least one communications medium from the plurality of remote units to the at least one TDD signal source. The TDD DCS also comprises the plurality of remote units each configured to distribute the received downlink TDD communications signals over the at least one communications medium from the central unit to at least one client device, and distribute the received uplink TDD communications signals from the at least one client device over the at least one communications medium to the central unit. The TDD DCS also comprises a TDD communications circuit comprising a downlink TDD communications circuit configured to distribute a received downlink TDD communications signal for a TDD communications session over a communications medium among the at least one communications medium in response to a transmission control signal indicating a downlink period in the TDD communications session, and an uplink TDD communications circuit configured to distribute a received uplink TDD communications signal for the TDD communications session over the communications medium among the at least one communications medium in response to the transmission control signal indicating an uplink period in the TDD communications session. The TDD DCS also comprises a TDD detection circuit comprising a power detector circuit configured to detect a power level in the downlink TDD communications signal, and generate a power level signal indicating the detected power level in the downlink TDD communications signal, and a processing circuit configured to generate a threshold power level signal indicating a threshold power level based on a determined lowest average power level in the power level signal. The TDD DCS also comprises a TDD period control circuit configured to compare the detected power level in the downlink TDD communications signal to the threshold power level, generate the transmission control signal indicating the downlink period in response to the detected power level being higher than the threshold power level, and generate the transmission control signal indicating the uplink period in response to the detected power level being lower than the threshold power level.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 9 is a state machine diagram illustrating an exemplary state machine process for TDD communications circuits in the TDD DCS in FIG. 4 distributing uplink TDD communications signals during uplink frame periods of a TDD frame and receiving downlink TDD communications signals during downlink frame periods of a TDD frame;

FIG. 11 is a table illustrating different uplink/downlink LTE TDD frame configurations that can be detected to synchronize LTE TDD uplink communications transmissions from TDD communications circuits to the TDD signal source in a TDD DCS in FIG. 4 based on the detected LTE TDD frame configuration;

DETAILED DESCRIPTION

Figure 1:
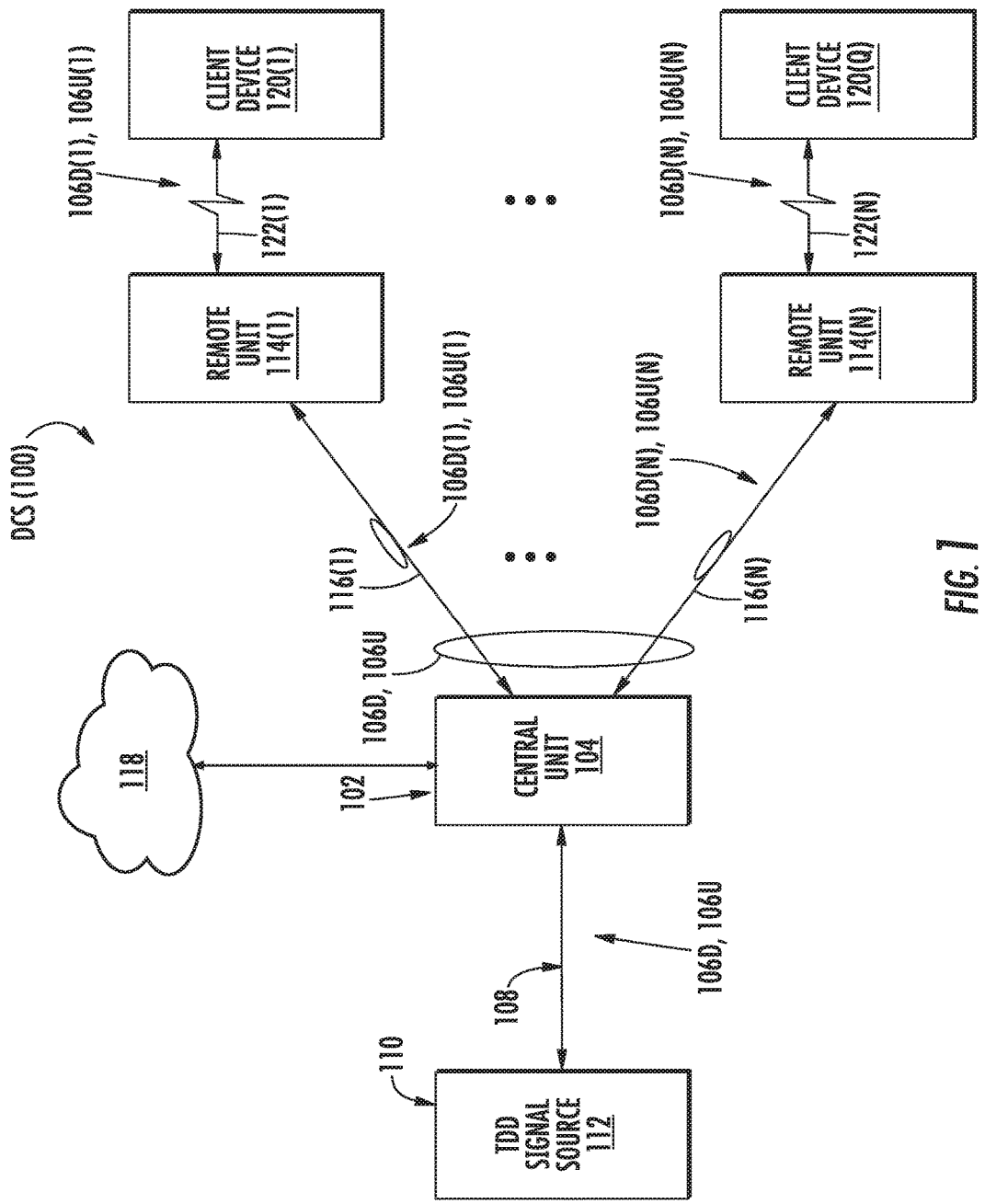
FIG. 1 is a schematic diagram of an exemplary point to multi-point time-division duplex (TDD) distributed communications system (DCS) employing TDD communications circuits in the form of a distributed antenna system (DAS), wherein a central unit is configured to detect uplink/downlink TDD frame configurations in TDD communications signals from a TDD base station and synchronize uplink communications transmissions from the TDD communications circuits to the TDD base station.

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts. Various embodiments will be further clarified by the following examples.

Embodiments disclosed herein include dynamic determination of threshold power level for use in distinguishing between downlink and uplink periods in time-division duplexed (TDD) communications. The threshold power level could be used, for example, in distinguishing between downlink and uplink periods in a TDD distributed communications system (DCS). The DCS may be a distributed antenna system (DAS) as a non-limiting example. In TDD communications, data is transferred on a common communications medium in radio frames that include pre-determined downlink periods (i.e., time slots) for transmission of downlink data and uplink periods for receiving uplink data. If downlink data is transmitted over the communications medium in an uplink period or vice versa, data loss may occur as a result of data collisions. Thus, in embodiments disclosed herein, the power level of a TDD communications signal is monitored and compared against a threshold power level. It is known that the power level of a TDD communications signal is lower during uplink periods of the radio frame and higher during downlink periods of the radio frame. Detecting a power level in a TDD communications signal less than the threshold power level is used to identify uplink periods in the TDD communications signal. In this manner, TDD communications circuits involved with transmitting TDD communications signals can synchronize their transmission circuitry to only transmit downlink TDD communications signals in downlink periods and receive uplink TDD communications signals in uplink periods. Noise present in a TDD communications signal during uplink periods can increase power in the TDD communications signal during such uplink periods. Also, data being absent during particular downlink periods in a TDD communications signal can cause the power in the TDD communications signal to be reduced during such downlink periods. If the threshold power level used to distinguish between downlink and uplink periods in a TDD communications signal is permanently set to static power level that is below the power level during uplink periods when noise is present, a true uplink period in the TDD communications signal may be detected as a downlink period. Similarly, if the threshold power level is permanently set to a static power level that is above the power level during downlink periods with reduced or absent data transmissions, a true downlink period in the TDD communications signal may be detected as an uplink period.

Thus, in exemplary embodiments disclosed herein, the threshold power level used to distinguish between downlink and uplink periods in a TDD communications signal can be dynamically determined to avoid mistakenly identifying an uplink period during a true downlink period in the TDD communications signals, or vice versa. In this regard, a power detector circuit is provided that detects the power level in a TDD communications signal and generates a power level signal indicating the detected power level in the TDD communications signal. The power level signal is sampled at a sampling rate into a plurality of power level samples. The sampling rate may be faster than a symbol rate in a radio frame of the TDD communications signal. The power level samples are divided into a plurality of power level sample blocks. The average power level of each power level sample block is determined. The power level sample block with the lower average power level is known to contain power level samples from an uplink period (e.g., an uplink sub-frame) of the TDD communications signal. If the number of power level sample blocks is at least twice the number of sub-frames in the TDD communications signal, the power level sample block with the lower average power level is known to exclusively contain power level samples from an uplink period of the TDD communications signal. The threshold power level for distinguishing between downlink and uplink periods in a TDD communications signal is then dynamically set based on the determined power level in a power level sample block determined to have a lower average power. In this manner, as an example, the determined threshold power level can be used to distinguish between downlink and uplink periods in a TDD communications signals.

Figure 2:
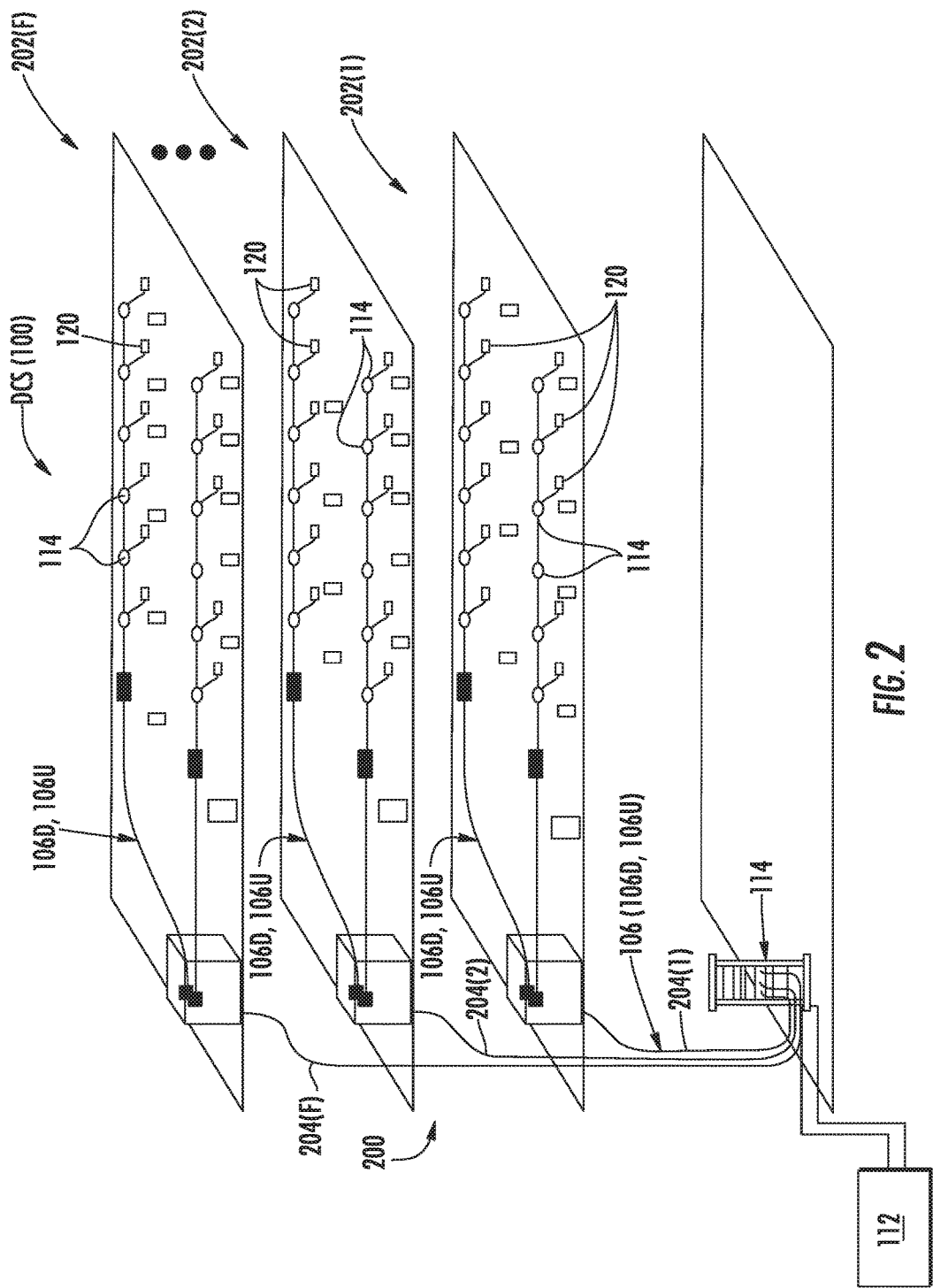
FIG. 2 is a schematic diagram of the exemplary TDD DCS in FIG. 1 provided in an indoor building and configured to distribute synchronized TDD communications services to different floors of the building.
Figure 3:
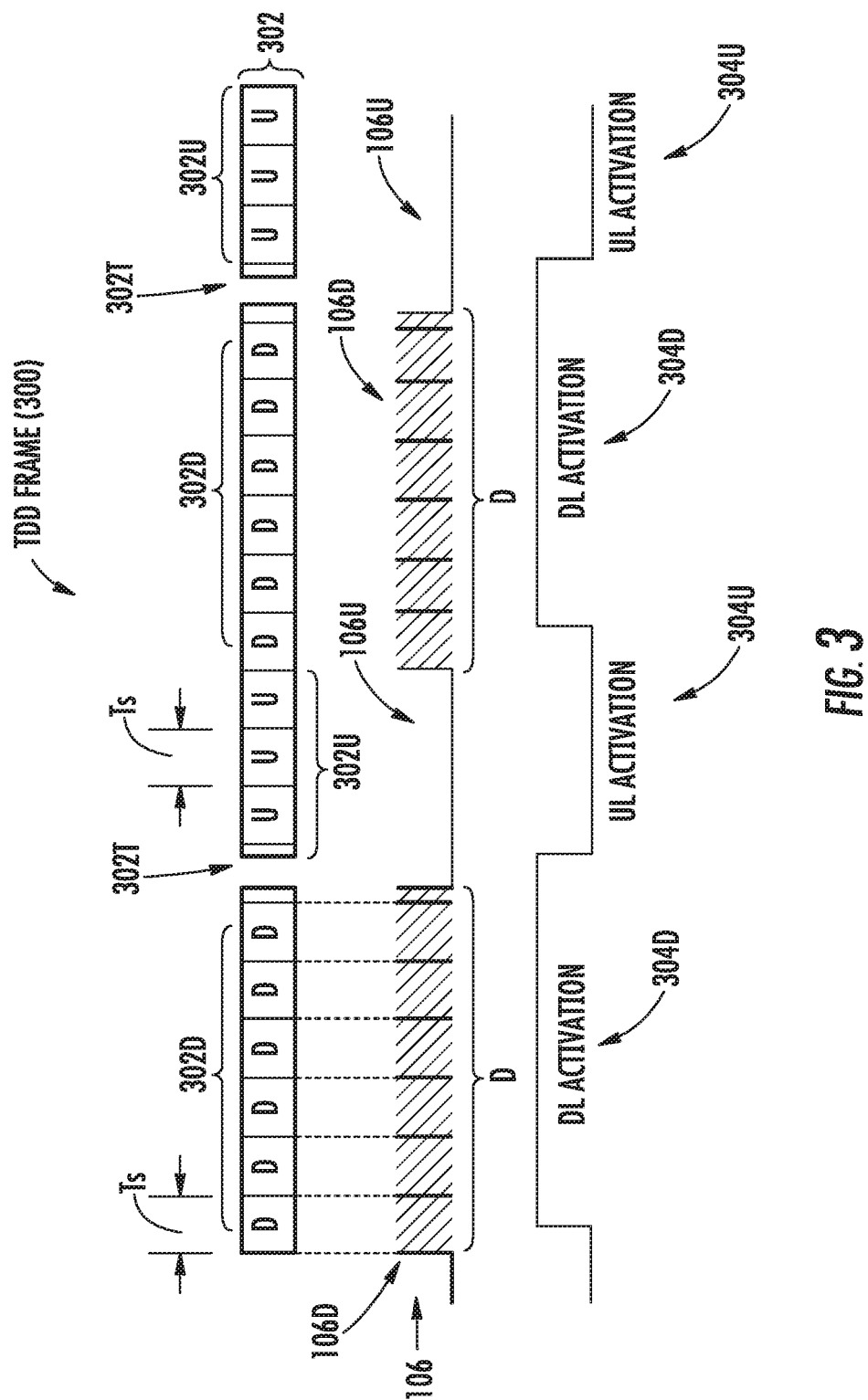
FIG. 3 is an exemplary diagram of detecting an uplink/downlink TDD frame configuration in TDD communications signals in the TDD DCS in FIG. 1, to synchronize uplink TDD communications transmissions from TDD communications circuits to the TDD base station.
Figure 4:
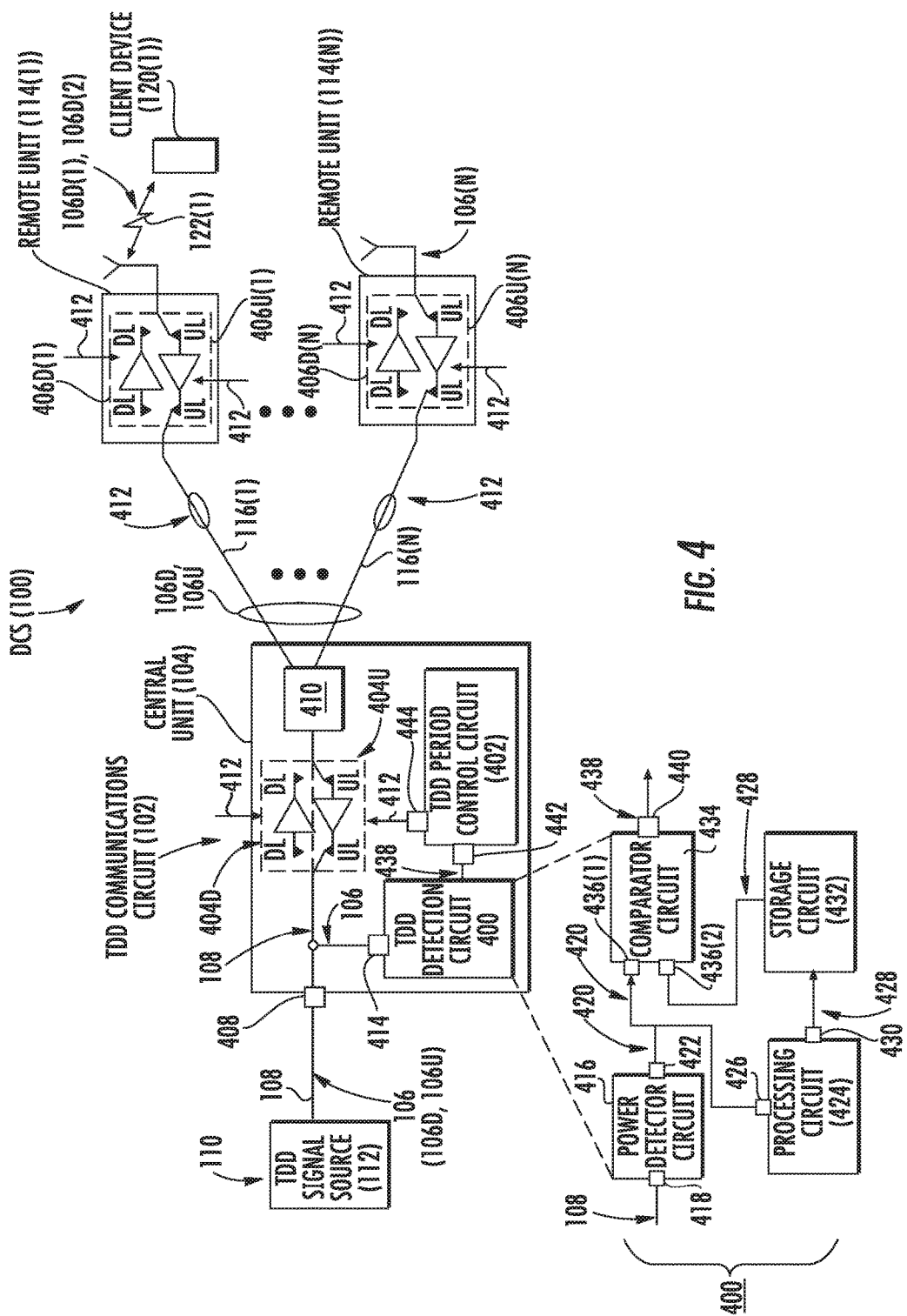
FIG. 4 is a schematic diagram of an exemplary TDD detection circuit included in the TDD DCS in FIG. 1, wherein the TDD detection circuit is configured to dynamically determine a threshold power level based on a determined low power level in the TDD communications signal, wherein the determined threshold power level can be used to detect downlink and uplink periods in the TDD communications signal for synchronizing downlink and uplink TDD communications circuits.

Before discussing examples of dynamic determination of threshold power level for use in distinguishing between downlink and uplink periods in TDD communications, such as in a DCS starting at FIG. 4, exemplary TDD communications systems are first described with regard to FIGS. 1-3.

In this regard, FIG. 1 is a schematic diagram of exemplary TDD communications circuits configured to communicate TDD communications signals over a common communications medium where it is desired to avoid data loss. FIG. 1 illustrates an example of a DCS 100 as a non-limiting example of a system that includes TDD communications circuits in this embodiment. The TDD DCS 100 in FIG. 1 is thus also referred to herein as a "TDD DCS 100." The TDD DCS 100 includes first TDD communications circuit 102 in the form of a central unit 104. The central unit 104 may also be referred to as a head-end unit (HEU) or head-end equipment (HEE). The central unit 104 could also be a TDD communications repeater as another example. The central unit 104 is configured to receive downlink TDD communications signals 106D over a communications medium 108 from a second TDD communications circuit 110 in the form of a TDD signal source 112. The TDD signal source 112 is configured to transmit and receive TDD-based communications signals. The TDD signal source 112 may be a TDD base station as a non-limiting example. The central unit 104 distributes the received downlink TDD communications signals 106D to one or more of a plurality of remote units 114(1)-114(N) in the TDD DCS 100 in a point-to-multipoint configuration in this example. The central unit 104 is communicatively coupled to the remote units 114(1)-114(N)

through dedicated communications mediums 116(1)-116(N) communicatively coupling the remote units 114(1)-114(N) to the central unit 104 in a point-to-multipoint configuration. The dedicated communications medium 116(1)-116(N) may be electrical or optical communications medium as examples. For example, the dedicated communications medium 116(1)-116(N) may be optical fibers. All the functionality of the central unit 104 may be a circuit-based system located on-site in proximity to the remote units 114(1)-114(N), or some of the functionality may be located off-site from the TDD DCS 100, such as through cloud-based services 118.

With continuing reference to FIG. 1, the central unit 104 is also configured to receive uplink TDD communications signals 106U from the remote units 114(1)-114(N). The remote units 114(1)-114(N) are remote antenna units in this example that can wirelessly receive the uplink TDD communications signals 106U from one or more client devices 120(1)-120(Q). For example, a client device 120(1)-120(Q) may be a cellular telephone, signal repeater, or other wired or wireless communications device. The remote units 114 (1)-114(N) may be configured to wirelessly communicate with the client devices 120(1)-120(Q) in communications range of a respective remote unit 114(1)-114(N), over physical communications links 122(1)-122(N), or both. The central unit 104 distributes the uplink TDD communications signals 106U received from the remote units 114(1)-114(N) over the communications medium 108 to the TDD signal source 112.

The TDD DCS 100 in FIG. 1 may be provided in an outdoor or an indoor environment. For example, FIG. 2 is a schematic diagram of the TDD DCS 100 in FIG. 1 provided in an indoor building 200 configured to distribute TDD communications services to different floors 202(1)-202(F) of the building 200 over communications media 204(1)-204(F).

With continuing reference to FIGS. 1 and 2, the communications medium 108 communicatively coupling the central unit 104 to the TDD signal source 112 in FIG. 1 is a common communications medium in this example. In other words, the communications medium 108 carries both the downlink TDD communications signals 106D and the uplink TDD communications signals 106U between the TDD signal source 112 and the central unit 104. As a non-limiting example, the communications medium 108 may be an electrical coaxial cable, twisted pair wiring (e.g., CAT5/6/7), or other communications medium. To avoid data loss of the downlink TDD communications signals 106D, the communications medium 108 is provided with a TDD duplex communications link. The downlink TDD communications signals 106D are separated from the uplink TDD communications signals 106U by the allocation of different time slots in the same frequency band. If the downlink TDD communications signals 106D and the uplink TDD communications signals 106U were communicated in the same time slots over the communications medium 108, data loss of the downlink TDD communications signals 106D would occur. The TDD communications circuits, namely the central unit 104 and the remote units 114(1)-114(N), may transmit the uplink TDD communications signals 106U when the downlink TDD communications signals 106D are being communicated to these units. Thus, it is desired to provide for the central unit 104 and remote units 114(1)-114(N) to not transmit the uplink TDD communications signals 106U in a time slot in which the downlink TDD communications signals 106D are being transmitted by the TDD signal source 112. However, the protocol of the particular TDD communications services may not include a marker or other indicia in a TDD communications frame that provides a known, guaranteed transition between a downlink communications period and an uplink communications period. Even if the protocol of the particular TDD communications services includes a marker or other indicia that provides a known, guaranteed transition between a downlink communications period and an uplink communications period, a modem may be required to detect such transition. For example, a Long Term Evolution (LTE) TDD frame includes a synchronization index, but in order to detect it, a LTE modem as a detection circuit is needed. The central unit 104 in FIG. 1 needs to have the capability of controlling transmission of the uplink TDD communications signals 106U in time periods of a TDD communications frame only when the downlink TDD communications signals 106D are not being transmitted on the communications medium 108.

For example, FIG. 3 is a diagram of an exemplary TDD frame 300 that governs communicating downlink and uplink TDD communications signals 106D, 106U in respective downlink and uplink time slots or periods to avoid data collisions. The TDD frame 300 is comprised of time or frame periods 302, each of a duration Ts. The frame periods 302 are configured to either be downlink frame periods 302D or uplink frame periods 302U according to the TDD frame 300. The downlink frame periods 302D are designated as times during downlink (DL) activation 304D when downlink communication data D can be communicated. The uplink frame periods 302U are designated as times during uplink (UL) activation 304U when uplink communication data U can be communicated. The downlink frame periods 302D and the uplink frame periods 302U in the TDD frame 300 are arranged according to a specific uplink/downlink TDD frame configuration. The TDD frame 300 can be employed by the TDD signal source 112 and the client devices 120 to control when their respective TDD transceivers transmit downlink TDD communications signals 106D and receive uplink TDD communications signals 106U. In this manner, the TDD frame 300 governs the timing for downlink communication data D and uplink communication data U to be communicated over the same communications medium (such as communications medium 108 in FIG. 1) at the same frequencies without data loss. Transition frame periods 302T may also be included in the TDD frame 300 that contain special data or information and provide a transition from a downlink frame period 302D to an uplink frame period 302U.

With continuing reference to FIG. 3, a TDD communications signal 106 constructed according to the TDD frame 300 that can be transmitted by the TDD signal source 112 in FIG. 1 is shown. The TDD communications signal 106 is comprised of the downlink TDD communications signal 106D and the uplink TDD communications signal 106U. Only the downlink TDD communications signal 106D of the TDD communications signal 106 is shown as containing downlink communication data D in FIG. 3. The central unit 104 in the TDD DCS 100 in FIG. 1 has downlink and uplink TDD communications circuits for receiving and distributing downlink and uplink TDD communications signals 106D, 106U over the common communications medium 108. The remote units 114(1)-114(N) in the TDD DCS 100 in FIG. 1 also have downlink and uplink TDD communications circuits for receiving and distributing downlink and uplink TDD communications signals 106D, 106U as downlink and uplink TDD communications signals 106D(1)-106D(N), 106U(1)-106U(N) over the respective dedicated common communications medium 116(1)-116(N). However, in both situations, downlink and uplink TDD communications circuits need to be controllably coupled to the communications medium 108, 116(1)-116(N) during the respective downlink and uplink periods according to the particular uplink/downlink TDD frame configuration of the TDD frame used by the TDD signal source 112 and client devices 120 for controlling timing of communications of the downlink and uplink TDD communications signals 106D, 106U. Thus, it would be desirable to provide for the ability of downlink and uplink TDD communications circuits in the TDD DCS 100 to be controlled to distribute downlink or uplink TDD communications signals 106D, 106U during the actual downlink or uplink periods according to the TDD frame used by the TDD signal source 112 and client devices 120 for controlling timing of communications of the downlink and uplink TDD communications signals 106D, 106U. Knowledge of the actual downlink and uplink periods in the TDD frame used by the TDD signal source 112 and client devices 120 to communicate downlink and uplink TDD communications signals 106D, 106U is needed to control downlink and uplink TDD communications circuits in the TDD DCS 100.

In this regard, FIG. 4 is a schematic diagram of the TDD DCS 100 in FIG. 1. As will be discussed in more detail below, the TDD DCS 100 in FIG. 4 is configured to dynamically determine a threshold power level that can be used to detect uplink and/or downlink periods in the downlink TDD communications signal 106D. The detected uplink and/or downlink periods in the downlink TDD communications signal 106D can be used to synchronize downlink and uplink TDD communications circuits in the TDD DCS 100. Common components shown in the TDD DCS 100 in FIGS. 1 and 4 are shown with common element numbers, and thus will not be re-described.

As will be discussed in more detail below, the TDD DCS 100 in FIG. 4 includes a TDD detection circuit 400. The TDD detection circuit 400 is shown as being part of the central unit 104, but such is not required. A TDD detection circuit like TDD detection circuit 400 could also be provided in the remote units 114(1)-114(N) or elsewhere in the TDD DCS 100. The TDD detection circuit 400 is configured to dynamically determine a threshold power level based on measured power levels in the TDD communications signal 106 over the communications medium 108 between the central unit 104 and the TDD signal source 112. The threshold power level is determined based on identifying a time period where the TDD communications signal 106 has lower power level, because the power level of the TDD communications signal 106 will be lower during uplink periods than downlink periods when downlink data is transmitted. The determined threshold power level can be used by a TDD period control circuit 402 to distinguish between downlink and uplink periods in the downlink TDD communications signal 106D for controlling the activation and deactivation downlink TDD communications circuit 404D and an uplink TDD communications circuit 404U in the central unit 104. The TDD period control circuit 402 is shown as being associated with the central unit 104, but alternatively, period control circuits like the TDD period control circuit 402 could also be provided in the remote units 114(1)-114(N) or elsewhere in the TDD DCS 100. The TDD period control circuit 402 can use the determined threshold power level to avoid mistakenly identifying an uplink period during a true downlink period in the downlink TDD communications signal 106D, and vice versa. The downlink TDD communications circuit 404D should be activated during downlink periods of the downlink TDD communications signal 106D and deactivated during uplink periods of the downlink TDD communications signal 106D. Also, the uplink TDD communications circuit 404U should be deactivated during downlink periods of the downlink TDD communications signal 106D and activated during uplink periods of the downlink TDD communications signal 106D. Similarly, downlink TDD communications circuits 406D(1)-406D(N) in the remote units 114(1)-114(N) should be activated during downlink periods of the downlink TDD communications signal 106D and deactivated during uplink periods of the downlink TDD communications signal 106D. Also, uplink TDD communications circuits 406U(1)-406U(N) in the remote units 114(1)-114(N) should be deactivated during downlink periods of the downlink TDD communications signal 106D and activated during uplink periods of the downlink TDD communications signal 106D.

Before discussing the exemplary details of the TDD detection circuit 400 and the TDD period control circuit 402 in the TDD DCS 100 in FIG. 4, other components of the central unit 104 and the remote units 114(1)-114(N) involved in distributing the TDD downlink and uplink TDD communications signals 106D, 106U are first described below.

With reference to FIG. 4, the downlink TDD communications signal 106D is received over the communications medium 108 by a TDD communications signal interface 408 in the central unit 104. The downlink TDD communications circuit 404D is provided in the central unit 104 and is coupled to the TDD communications signal interface 408. The downlink TDD communications circuit 404D is coupled to a communications interface 410 and configured to distribute the downlink TDD communications signals 106D received from the TDD signal source 112 to the remote units 114(1)-114(N). Downlink TDD communications circuits 406D(1)-404D(N) are also provided in the remote units 114(1)-114(N) to receive the downlink TDD communications signals 106D distributed by the central unit 104. In this example, the downlink TDD communications circuits 404D, 406D(1)-406D(N) may be configured to be activated to receive the downlink TDD communications signal 106D from the TDD signal source 112 and distribute such downlink TDD communications signal 106D to the remote units 114(1)-114(N) during downlink periods based on a received transmission control signal 412 indicating a downlink period. As will be discussed in more detail below, the TDD period control circuit 402 generates the transmission control signal 412 based on detecting whether the downlink TDD communications signal 106D is in a downlink or uplink period based on comparing the determined threshold power level from the TDD detection circuit 400 to the power level of the TDD communications signal 106. For example, the transmission control signal 412 may be encoded with an indicator indicating a downlink period or uplink period. The transmission control signal 412 may also be generated as separate downlink and uplink transmission control signals if desired. The remote units 114(1)-114(N) may not be required to receive the transmission control signal 412 from the central unit 104 if the remote units 114(1)-114(N) contain TDD detection circuits 400 and TDD period control circuits 402.

With continuing reference to FIG. 4, the uplink TDD communications circuit 404U is also provided in the central unit 104 and is also coupled to the TDD communications signal interface 408. The uplink TDD communications circuit 404U is configured to distribute (e.g., transmit) the uplink TDD communications signal 106U over the communications medium 108 to the TDD signal source 112 during uplink periods of the downlink TDD communications signal

106D. Uplink TDD communications circuits 406U(1)-406U(N) are also provided in the remote units 114(1)-114(N) to distribute (e.g., transmit) the uplink TDD communications signal 106U to the central unit 104 through the communications interface 410 over the respective communications medium 116(1)-116(N) during uplink periods of the downlink TDD communications signal 106D. The uplink TDD communications circuits 404U, 406U(1)-406U(N) are configured to be activated to distribute the uplink TDD communications signal 106U to the TDD signal source 112 respectively, during uplink periods based on the received transmission control signal 412 indicating an uplink period. Alternatively, the remote units 114(1)-114(N) may be configured to identify the uplink period without being required to receive a transmission control signal 412 from the central unit 104 if the remote units 114(1)-114(N) contain TDD detection circuits 400 and TDD period control circuits 402.

Thus in summary, in this example of the TDD DCS 100 in FIG. 4, the downlink TDD communications circuits 404D, 406D(1)-406D(N) and the uplink TDD communications circuits 404U, 406U(1)-406U(N) are controlled to receive and distribute the downlink TDD communications signal 106D and uplink TDD communications signal 106U in respective downlink and uplink periods of the downlink TDD communications signal 106D to avoid data loss.

Figure 5:
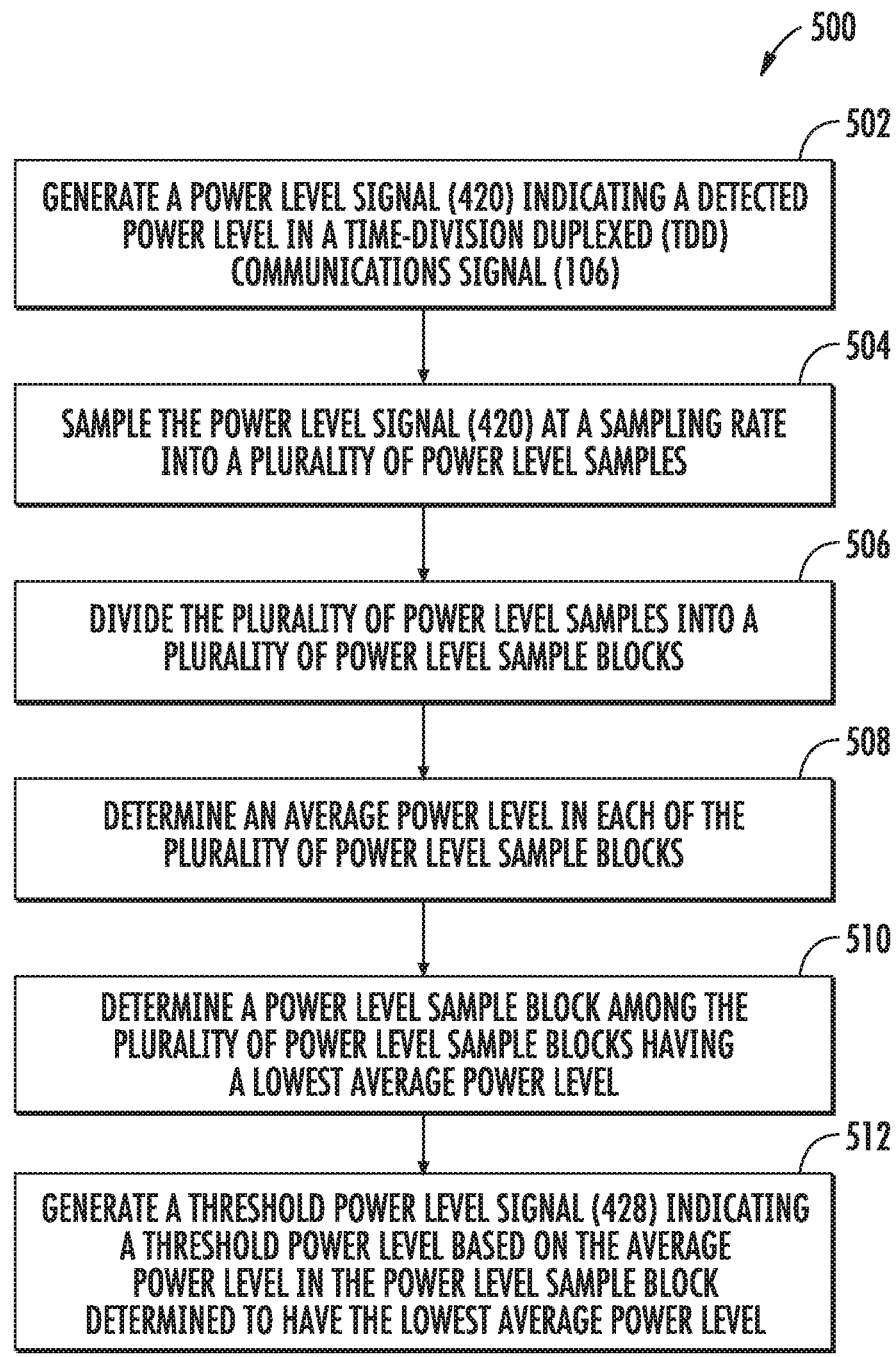
FIG. 5 is a flowchart of an exemplary process of dynamically determining a threshold power level distinguishing downlink and uplink periods in a TDD communications signal based on determining a lower power level in the TDD communications signal.

Exemplary aspects of the TDD detection circuit 400 and the TDD period control circuit 402 in the TDD DCS 100 in FIG. 4 will now be described in conjunction with FIG. 5. FIG. 5 is a flowchart of an exemplary process 500 of dynamically determining a threshold power level distinguishing downlink and uplink periods in the TDD communications signal 106 based on determining a lower power level in the TDD communications signal 106. With reference to FIG. 4, the TDD detection circuit 400 includes a TDD communications signal input 414 configured to receive the TDD communications signal 106 as an input signal. The TDD detection circuit 400 includes a power detector circuit 416 configured to detect a power level in the TDD communications signal 106. The power detector circuit 416 includes a power detector input 418 communicatively coupled to the TDD communications signal input 414. The power detector circuit 416 is configured to measure the power level of the TDD communications signal 106 and generate a power level signal 420 indicating the detected power level in the TDD communications signal 106 (block 502 in FIG. 5) on a power detector output 422. For example, the power level signal 420 may be a power level voltage signal whose amplitude is a function of the detected power level in the TDD communications signal 106. The detected power level in the TDD communications signal 106 is used identify an uplink period in the TDD communications signal 106. The power level in the TDD communications signal 106 is lower during uplink periods than in downlink periods, because the TDD signal source 112 is transmitting the TDD communications signal 106 at a power level sufficient to be received at the central unit 104 and distributed to the remote units 114(1)-114(N) at an acceptable signal-to-noise ratio (SNR). The power level in the identified uplink periods of the TDD communications signal 106 can then be used dynamically determine a threshold power level for distinguishing between downlink and uplink periods in the TDD communications signal 106 during normal operations.

By using the power level in the identified uplink periods of the TDD communications signal 106 to determine and set the threshold power level, the TDD DCS 100 is less susceptible to an increase in power level due to noise present in the uplink TDD communications signal 106U being mistaken for a downlink period of the TDD communications signal 106. Thus, using the power level in the identified uplink periods of the TDD communications signal 106 to determine and set the threshold power level can automatically and dynamically compensate for different types of communications equipment having different levels of noise. Different types of communications equipment may have different levels of noise even with the noise being within prescribed limits for the applicable communications standards. Noise present in the downlink TDD communications signal 106D during uplink periods can increase power in the downlink TDD communications signal 106D during such uplink periods. For example, a TDD transceiver in the TDD signal source 112 may have relatively high noise level at its antenna port during reception. This noise level might change dramatically if and when this TDD transceiver transmits the downlink TDD communications signal 106D to the central unit 104 at a different power level. Also, data being absent during particular downlink periods in the TDD communications signal 106 can cause the power in the TDD communications signal 106 to be reduced during such downlink periods. If the threshold power level used to distinguish between downlink and uplink periods in the TDD communications signal 106 were set to a static power level that is below the power level during uplink periods when noise is present, a true uplink period in the TDD communications signal 106 may be detected as a downlink period. Similarly, if the threshold power level is set to a static power level that is above the power level during downlink periods with reduced or absent data transmissions, a true downlink period in the TDD communications signal 106 may be mistakenly detected as an uplink period.

With continuing reference to FIG. 4, the TDD detection circuit 400 also includes a processing circuit 424. The processing circuit 424 may be a processor, a programmable controller circuit, such as a field programmable gate array (FPGA) for example, or dedicated circuitry. The processing circuit 424 includes a processing circuit input 426 communicatively coupled to the power detector output 422 in this example. The processing circuit 424 is configured to sample the power level signal 420 from the power detector circuit 416 at a sampling rate into a plurality of power level samples (block 504 in FIG. 5). The power level signal 420 is sampled to determine if the detected power level in the TDD communications signal 106 indicates a downlink transmission power level in a downlink period or noise in an uplink period. For example, if the frame of the TDD communications signal 106 is a TDD frame, like the TDD frame 300 shown in FIG. 3 for example, with a 10 ms frame period consisting of 1 ms sub-frames with a 71.4 μs symbol rate, the processing circuit 424 may be configured to sample the power level signal 420 every 50 μs to produce 200 total power level samples. In this example, the sampling rate is selected to be faster than the symbol rate to guarantee that each symbol in the TDD communications signal 106 is sampled at least once.

With continuing reference to FIG. 4, in this example, the processing circuit 424 is configured to divide the plurality of power level samples (which may be power level voltage samples) into a plurality of power level sample blocks (block 506 in FIG. 5). For example, using the above example, the processing circuit 424 may be configured to divide the 200 total power level samples into 20 sample blocks each containing 10 power level samples. By providing a number of power level sample blocks that is at least twice the number of sub-frames in the TDD communications signal 106, it is guaranteed that at least one power level sample block will exclusively contain power level samples from an uplink period (i.e., uplink sub-frame) of the TDD communications signal 106. This may be advantageous, because the processing circuit 424 can then identify an uplink period in the TDD communications signal 106 based on the power level sample block having the lowest average power level. In this regard, the processing circuit 424 determines the average power level in each of the plurality of power level sample blocks (block 508 in FIG. 5). The processing circuit 424 then determines the power level sample block among the plurality of power level sample blocks having the lowest average power level to identify an uplink period in the TDD communications signal 106 (block 510 in FIG. 5). Again, in this example, the identified power level sample block for the uplink period is known to not contain power level samples for downlink data that would affect the average power level sample block. Thus, the power level of the identified power level sample block for the uplink period can be used to dynamically generate a threshold power level signal 428 indicating a threshold power level (block 512 in FIG. 5). The processing circuit 424 generates the threshold power level signal 428 on a processing circuit output 430 indicating the determined threshold power level. The threshold power level signal 428 may be a threshold power level voltage signal having a voltage amplitude indicative of the determined threshold power level.

Figure 6:
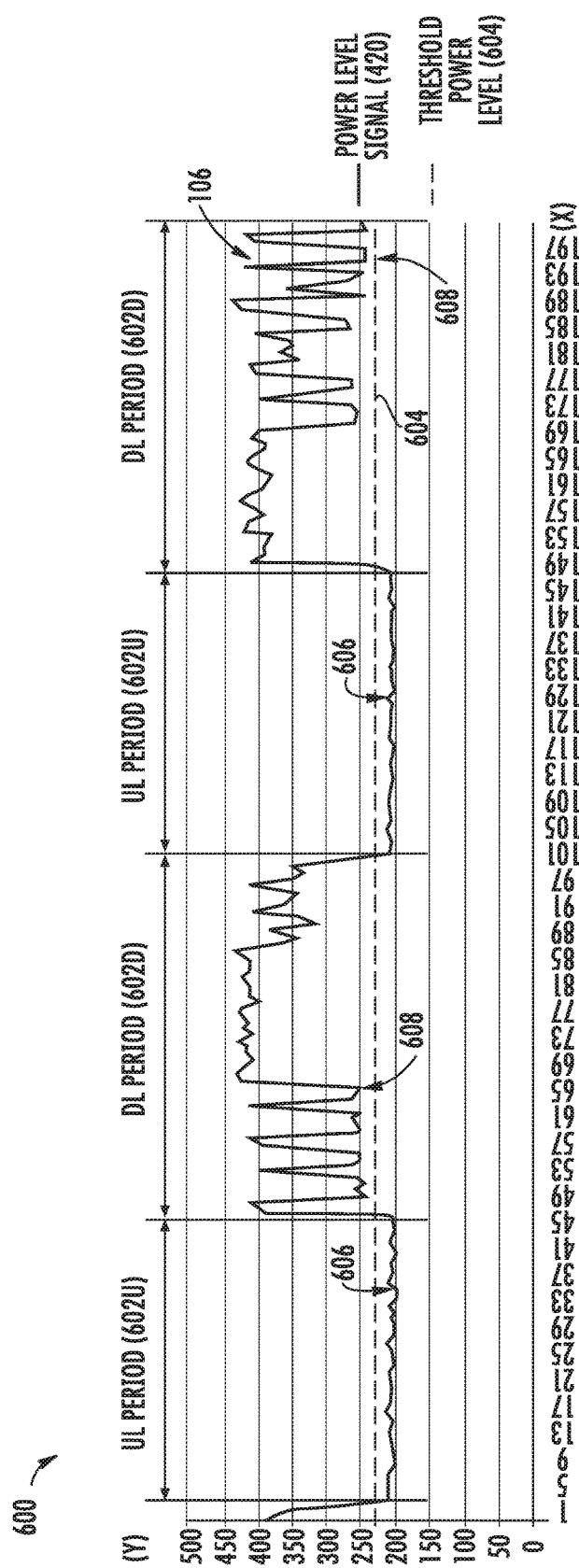
FIG. 6 is a graph illustrating exemplary detected power levels in an exemplary TDD communications signal during downlink and uplink periods as compared to a dynamically determined threshold power level to distinguish between downlink and uplink periods.

Thus, if any noise is present in the power level samples in the power level sample block identified as having the lowest average power level, the noise will be present in the calculation of this average power level. Thus, the threshold power level is set based on any such noise present so that the threshold power level will be set at or above this noise level to provide a more accurate threshold power level for distinguishing between a downlink period and an uplink period in the TDD communications signal 106. This is shown by in an exemplary graph 600 in FIG. 6. FIG. 6 is a chart illustrating detected power levels in a TDD communications signal 106 during downlink periods (DL PERIOD) 602D and uplink period (UL PERIOD) 602U as compared to a dynamically determined threshold power level 604 using the example described above in FIG. 4 to distinguish between downlink and uplink periods 600D, 600U in the TDD communications signal 106. As shown in FIG. 6, there may be noise 606 in the uplink periods 602U. The noise 606 may be such that it causes the TDD communications signal 106 to be close to the threshold power level 604 during the uplink periods 602U. Note that the threshold power level 604 is set to a power level that exceeds the power level in the uplink periods 602U, but is below the power level in the downlink periods 602D. However, if the power level samples during the downlink periods 602D were used to determine the threshold power level, the periods where downlink data is not being transmitted such as shown at arrows 608 in downlink periods 602D would influence the determination of the threshold power level. This may have the effect of increasing the threshold power level such that a downlink period 602D may be mistakenly identified as an uplink period 602U.

In one example, the processing circuit 424 may be configured to set the threshold power level between detected downlink and uplink power in the TDD communications signal 106. This is so that the threshold power level is set to be between the minimum uplink power of the TDD communications signal 106 and the maximum downlink power of the TDD communications signal 106. In this regard, the processing circuit 424 may also be configured to identify X number of power level samples in the power level sample blocks that have the highest power level and average these power levels to provide a maximum downlink power $DL_{max}$. The determined average power level of the power level sample block having the lowest average power is deemed the minimum uplink power $UL_{min}$. The processing circuit 424 could then calculate the power threshold level as $(DL_{max}-UL_{min})/2+UL_{min}$, as a non-limiting example. In this non-limiting example, adding back in detected noise in the minimum uplink power $UL_{min}$ may be important so that the threshold power level is guaranteed to be at or above the minimum uplink power $UL_{min}$ to account for noise in the uplink periods.

With continuing reference to FIG. 4, the TDD detection circuit 400 may also include a storage circuit 432 that is coupled to the processing circuit output 430 to receive the threshold power level signal 428 from the processing circuit 424. The processing circuit 424 can be configured to provide the threshold power level signal 428 in digital form to the storage circuit 432. The storage circuit 432 can be configured to store the determined threshold power level based on the threshold power level signal 428. The storage circuit 432 may include a digital-to-analog (D/A) converter that is configured to convert the amplitude of the threshold power level signal 428 back to an analog representation before passing to the comparator circuit 434. The TDD detection circuit 400 can be configured to repeatedly measure the power level in the TDD communications signal 106 and dynamically calculate a threshold power level that can be used to distinguish between uplink and downlink periods in the TDD communications signal 106.

With continuing reference to FIG. 4, the TDD detection circuit 400 can also include a comparator circuit 434. The comparator circuit 434 can be configured to compare the dynamically determined threshold power level to the instantaneous power level of the TDD communications signal 106 to distinguish between a downlink and uplink period in the TDD communications signal 106. In this regard, the comparator circuit 434 is configured to receive the power level signal 420 (e.g., as a voltage signal) on a comparator input 436(1) from the power detector circuit 416. The comparator input 436(1) may be communicatively coupled to the power detector output 422 to receive the power level signal 420. The comparator circuit 434 is configured to receive the dynamically determined threshold power level on a comparator input 436(2) from the storage circuit 432 in this example. Alternatively, the comparator circuit 434 could be configured to receive the dynamically determined threshold power level in the threshold power level signal 428 directly from the processing circuit 424. The comparator circuit 434 is configured to compare the threshold power level signal 428 with the detected power level signal 420. The comparator circuit 434 is configured to generate a comparator output signal 438 on a comparator output 440 indicating the difference between the threshold power level signal 428 and the detected power level signal 420. This difference may be represented by an analog signal or may be represented by a voltage value indicating a logical value as either logical '0' or '1'. For example, if the power level of the TDD communications signal 106 represented by the detected power level signal 420 is less than the threshold power level represented by the threshold power level signal 428, the TDD communications signal 106 is in an uplink period. If however, the power level of the TDD communications signal 106 represented by the detected power level signal 420 is greater than the threshold power level represented by the threshold power level signal 428, the TDD communications signal 106 is in a downlink period. The comparator circuit 434 can be configured to generate the comparator output signal 438 as a logical '0' or '1' to indicate a downlink period, and vice versa for an uplink period.

Figure 7:
FIG. 7 is a graph illustrating exemplary power levels in exemplary downlink and uplink periods in an exemplary TDD communications signal.

FIG. 7 is a graph 700 illustrating exemplary power levels in exemplary downlink and uplink periods 702D, 702U to illustrate an example of how the aspects disclosed herein for dynamically determining the threshold power level adapted to the uplink power level of the TDD communications signal 106 may be advantageous. As shown in FIG. 7, the uplink power may be higher in the uplink period 702U due to noise for TDD communications signal 1 (TDD COMM. SIG. 1) than for TDD communications signal 2 (TDD COMM. SIG. 2). The uplink power may be higher in the uplink period 702U due to noise for TDD communications signal 2 (TDD COMM. SIG. 2) than for TDD communications signal 3 (TDD COMM. SIG. 3). Thus, the aspects disclosed herein, by being able to determine the threshold power level based on the power level in the uplink period 702U, can dynamically adjust the threshold power level for TDD communications signals 1, 2, and 3 as threshold power levels A, B, and C. For example, if threshold power level A were used for TDD communications signal 2 or 3, there are times in the downlink periods 702D shown in FIG. 7 where the threshold power level A is higher than the power level in TDD communications signal 2 or 3. Thus, if a set threshold power level A were used to distinguish between downlink and uplink periods 702D, 702U in TDD communications signal 2 or 3, the downlink period 702D may be mistakenly identified as an uplink period 702U.

With continuing reference to FIG. 4, the central unit 104 in this example includes the TDD period control circuit 402. The TDD period control circuit 402 may be a processor, central processing unit (CPU), field programmable gate array (FPGA), or other circuit, as non-limiting examples. The TDD period control circuit 402 is configured to receive the comparator output signal 438 on a TDD period control input 442 as an indication if the TDD communications signal 106 is present in a downlink period or uplink period. As previously discussed, the TDD period control circuit 402 is configured to generate the transmission control signal 412 indicating a downlink period to control activation of the downlink TDD communications circuits 404D, 406D(1)-406D(N) in the central unit 104 and the remote units 114(1)-114(N) respectively during a detected downlink period. The transmission control signal 412 may be communicated over the communications medium 116(1)-116(N) (e.g., as a management signal) from the central unit 104 to the remote units 114(1)-114(N) as a non-limiting example. The transmission control signal 412 indicating a downlink period deactivates the uplink TDD communications circuits 404U, 406U(1)-406U(N) in the central unit 104 and the remote units 114(1)-114(N). The TDD period control circuit 402 is configured to generate the transmission control signal 412 indicating an uplink period to control activation of the uplink TDD communications circuits 404U, 406U(1)-406U(N) in the central unit 104 and the remote units 114(1)-114(N) respectively during a detected uplink period. The transmission control signal 412 indicating an uplink period deactivates the downlink TDD communications circuits 404D, 406D(1)-406D(N) in the central unit 104 and the remote units 114(1)-114(N).

The TDD period control circuit 402 may also be configured to use the comparator output signal 438 to detect uplink/downlink TDD frame configuration of the TDD frame of the TDD communications signal 106 to synchronize the generation of the transmission control signal 412 to the TDD frame of the TDD communications signal 106. For example, the TDD frame of the TDD communications signal 106 may be the TDD frame 300 illustrated in FIG. 3. In the example discussed below, the TDD period control circuit 402 may also be configured to determine the uplink/downlink TDD frame configuration of the TDD frame 300 of the TDD communications signal 106 based on transitions between the downlink TDD communications signal 106D and the uplink TDD communications signal 106U communicated over the communications medium 108.

Figure 8A:
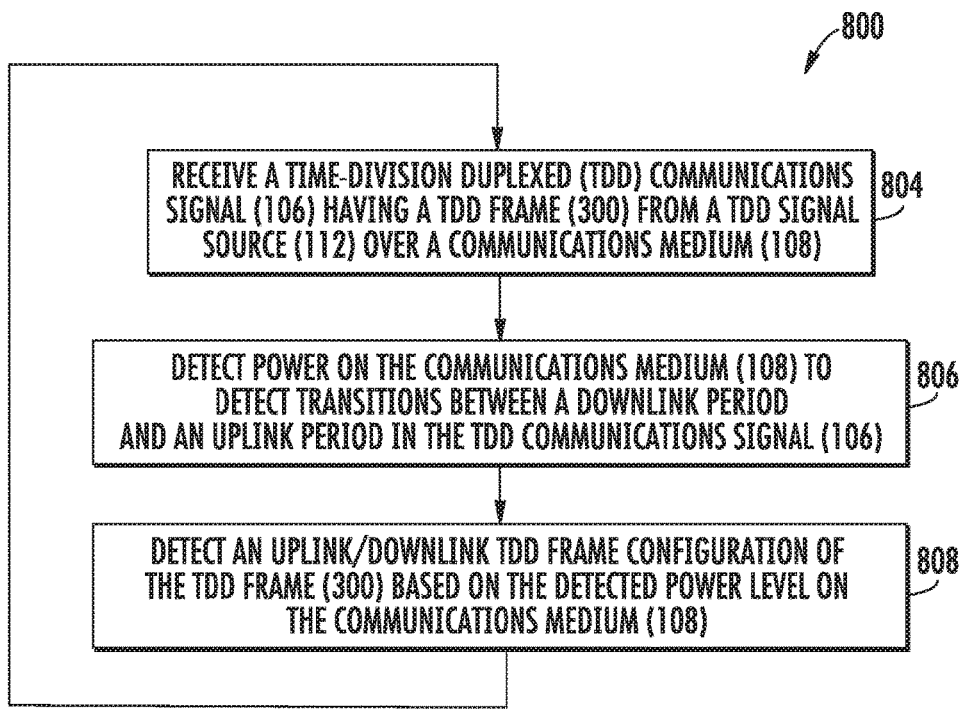
FIG. 8A is a flowchart illustrating an exemplary process of detecting an uplink/downlink TDD frame configuration in TDD communications signals in the TDD DCS in FIG. 4 using an automatic determined threshold power level to distinguish between downlink and uplink periods in the TDD communications signals.
Figure 8B:
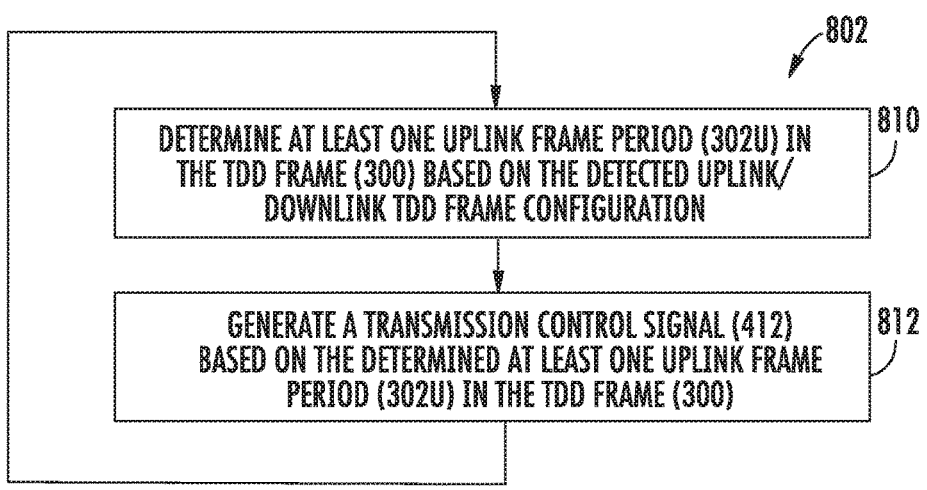
FIG. 8B is a flowchart illustrating an exemplary process for synchronizing uplink TDD communications transmissions from the TDD communications circuits in the TDD DCS in FIG. 4 to a TDD signal source based on the detected uplink/downlink TDD frame configuration from the exemplary process in FIG. 8A.

In this regard, FIG. 8A is a flowchart illustrating an exemplary process 800 for a TDD period control circuit, such as the TDD period control circuit 402 in the central unit 104 in the TDD DCS 100 in FIG. 4, to detect the uplink/downlink TDD frame configuration of the TDD frame 300 used by the TDD signal source 112 to control transmission timing of the downlink TDD communications signals 106D. FIG. 8B is a flowchart illustrating an exemplary process 802 for downlink and uplink TDD communications circuits 404D, 404U in the central unit 104 and/or the downlink and uplink TDD communications circuits 406D(1)-406D(N), 406U(1)-406U(N) in the remote units 114(1)-114(N) in the TDD DCS 100 in FIG. 4, synchronizing uplink TDD communications signal 106U transmissions. The exemplary processes in FIGS. 8A and 8B will be discussed with reference to the exemplary components of the central unit 104 in the TDD DCS 100 in FIG. 4.

With reference to FIG. 8A, the central unit 104 receives the downlink TDD communications signal 106D over the communications medium 108 through the TDD communications signal interface 408 coupled to the communications medium 108 (block 804). If the configuration of the uplink/downlink TDD frame 300 of the TDD communications signal 106 is not known by the central unit 104, the uplink/downlink TDD frame 300 configuration can be detected based on comparison to known uplink/downlink TDD frame configurations based on detecting power on the communications medium 108 to detect transitions between the downlink and uplink periods in the TDD communications signal 106 (block 806). This comparison to known uplink/downlink TDD frame configurations may be based on detected power in the TDD communications signal 106 communicated over the communications medium 108 represented by the comparator output signal 438 (block 808). Examples of detecting the uplink/downlink TDD frame 300 configuration based on detected power level are described in more detail below.

The uplink/downlink TDD frame 300 configuration detected in the process in FIG. 8A can be used to synchronize the transmission of the uplink TDD communications signals 106U and the reception of downlink TDD communications signals 106D in the TDD DCS 100. In this regard, FIG. 8B is a flowchart illustrating the exemplary process 802 for synchronizing the uplink TDD communications signal 106U transmissions by the uplink TDD communications circuits 404U, 406U(1)-406U(N) in the TDD DCS 100. With reference to FIG. 8B, the TDD period control circuit 402 determines the uplink frame period 302U in the TDD frame 300 of the TDD communications signal 106 based on the detected uplink/downlink TDD frame configuration based on the power transitions in downlink and uplink periods in the TDD communications signal 106 on the communications medium 108 (block 810). In this manner, the TDD period control circuit 402 can use its knowledge of the uplink frame period(s) 302U in the TDD frame 300 to determine when to activate the uplink TDD communications circuits 404U, 406U(1)-406U(N) to transmit the uplink TDD communications signals 106U to the TDD signal source 112 in synchronization with the uplink frame period(s) 302U. Thus, the uplink TDD communications signals 106U are not transmitted when the downlink TDD communications signals 106D are being received. For example, the TDD period control circuit 402 may generate a timing pattern for the TDD frame 300 that can be used to synchronize the transmission of the uplink TDD communications signals 106U and the reception of the downlink TDD communications signals 106D.

A more specific, non-limiting process for determining the uplink frame period 302U in the downlink TDD communications signal 106D based on the detected uplink/downlink TDD frame configuration of the downlink TDD communications signal 106D (block 810) may be as follows. Once the uplink/downlink TDD frame configuration of the downlink TDD communications signal 106D has been detected (block 810), the TDD period control circuit 402 can detect transitions in power on the communications medium 108 from an uplink frame period 302U to a downlink frame period 302D in the downlink TDD communications signal 106D and vice versa. This allows the TDD period control circuit 402 to a create a TDD frame timing pattern by matching the detected uplink/downlink TDD frame configuration with the actual timing transitions between downlink TDD communications signal 106D and uplink TDD communications signal 106U power to synchronize the generation of the transmission control signal 412 indicating an uplink period within the uplink frame period 302U of the TDD frame 300. The TDD period control circuit 402 generates the transmission control signal 412 indicating an uplink period for the uplink frame period 302U according to the TDD frame 300 timing pattern and a timing based from detected transitions of the uplink frame period 302U to a downlink frame period 302D on the communications medium 108 and vice versa.

With continuing reference to FIG. 8B, the TDD period control circuit 402 generates the transmission control signal 412 indicating an uplink period based on the determined uplink frame period(s) 302U in the TDD frame 300 (block 812). The uplink TDD communications circuits 404U, 406U(1)-406U(N) in the central unit 104 and the remote units 114(1)-114(N), respectively, receive the transmission control signal 412. During uplink frame periods 302U in the TDD frame 300, the transmission control signal 412 causes the uplink TDD communications circuits 404U, 406U(1)-406U(N) to distribute the uplink TDD communications signals 106U to the TDD signal source 112 and the central unit 104, respectively, as illustrated in uplink transmission process 900 in the state machine in FIG. 9. In this manner, the uplink TDD communications circuits 404U, 406U(1)-406U(N) distribute the uplink TDD communications signals 106U in synchronization with the uplink frame period(s) 302U in the TDD frame 300. Also during the uplink frame periods 302U in the TDD frame 300, the transmission control signal 412 indicating an uplink period causes the downlink TDD communications circuits 404D, 406D(1)-406D(N) to be deactivated so as to not sample the downlink TDD communications signals 106D (process 902 in FIG. 9) during the uplink frame periods 302U in the TDD frame 300. This is so that the downlink TDD communications circuits 404D, 406D(1)-406D(N) are not activated to receive downlink TDD communications signals 106D during the uplink frame period(s) 302U in the TDD frame 300 when uplink TDD communications signals 106U are being distributed (process 902 in FIG. 9).

The TDD period control circuit 402 may optionally be configured to generate the transmission control signal 412 indicating an uplink period just prior to and in anticipation of the start of the uplink frame period 302U in the TDD frame 300 (e.g., a few microseconds prior). In this manner, the TDD period control circuit 402 can compensate for propagation delay between the generation of the transmission control signal 412 indicating an uplink period and activation of the uplink TDD communications circuits 404U, 406U(1)-406U(N) in response to receipt of the transmission control signal 412 indicating an uplink period so that data communications rates are not reduced as a result of the delay. Also, the TDD period control circuit 402 may optionally be configured to generate the transmission control signal 412 indicating a downlink period just prior to and in anticipation of the start of the downlink frame period 302D in the TDD frame 300 (e.g., a few microseconds prior). In this manner, the TDD period control circuit 402 can compensate for propagation delay between the generation of the transmission control signal 412 and activation of the downlink TDD communications circuits 404D, 406D(1)-406D(N) in response to receipt of the transmission control signal 412 indicating a downlink period so that data communications rates are not reduced as a result of the delay.

In addition, the TDD period control circuit 402 in this embodiment is also configured to generate the transmission control signal 412 based on the determined downlink frame period(s) 302D in the TDD frame 300. This is so that the downlink TDD communications circuits 404D, 406D(1)-406D(N) are activated to receive downlink TDD communications signals 106D during the downlink frame period(s) 302D in the TDD frame 300 when the uplink TDD communications signals 106U are not being transmitted (process 904 in FIG. 9). The downlink TDD communications circuits 404D, 406D(1)-406D(N) receive the transmission control signal 412 indicating a downlink period. This causes the downlink TDD communications circuits 404D, 406D(1)-406D(N) to be activated to receive the downlink TDD communications signals 106D from the TDD signal source 112 during downlink frame periods 302D in the TDD frame 300 (process 904 in FIG. 9). This is so that the downlink TDD communications circuits 404D, 406D(1)-406D(N) are activated to receive downlink TDD communications signals 106D during the downlink frame period(s) 302D in the TDD frame 300 (process 904 in FIG. 9). During the downlink frame periods 302D in the TDD frame 300, the transmission control signal 412 indicating a downlink period is configured to cause the uplink TDD communications circuits 404D, 406D(1)-406D(N) to be deactivated so that uplink TDD communications signals 106D are not transmitted during downlink frame periods 302D in the TDD frame 300 (process 904 in FIG. 9).

Also note that the steps in the exemplary process 800 in FIG. 8A may performed repeatedly to continuously detect the uplink/downlink TDD frame configuration. In this manner, if the uplink/downlink configuration of the TDD frame 300 provided by the TDD signal source 112 changes, the changed uplink/downlink TDD frame configuration can automatically be detected by the TDD period control circuit 402 to adjust synchronization of uplink TDD communications signals 106U with uplink frame periods 302U in the TDD frame 300. Similarly, the process 802 in FIG. 8B may also be performed repeatedly to continuously generate the transmission control signal 412 based on the detected uplink/downlink TDD frame configuration in the process 800 in FIG. 8A, to cause the uplink TDD communications signals 106U to be distributed during uplink frame periods 302U in the TDD frame 300 in synchronization with downlink frame periods 302D in the TDD frame 300.

The embodiments disclosed herein for detecting an uplink/downlink TDD frame configuration of a TDD frame of TDD communications signals, and synchronizing TDD uplink TDD communications transmissions based on the detected TDD frame configuration can be employed for different types of TDD communications signals and services. Non-limiting examples include WiMAX, Digital Enhanced Cordless Telecommunications (DECT) wireless telephony, and TD-code Division Multiple Access (CDMA) (TD-CDMA). Another example of such TDD communications services is TDD communications signals according to Long Term Evolution (LTE) protocol. LTE TDD communications signals are formatted according to a particular LTE TDD frame.

Figure 10:
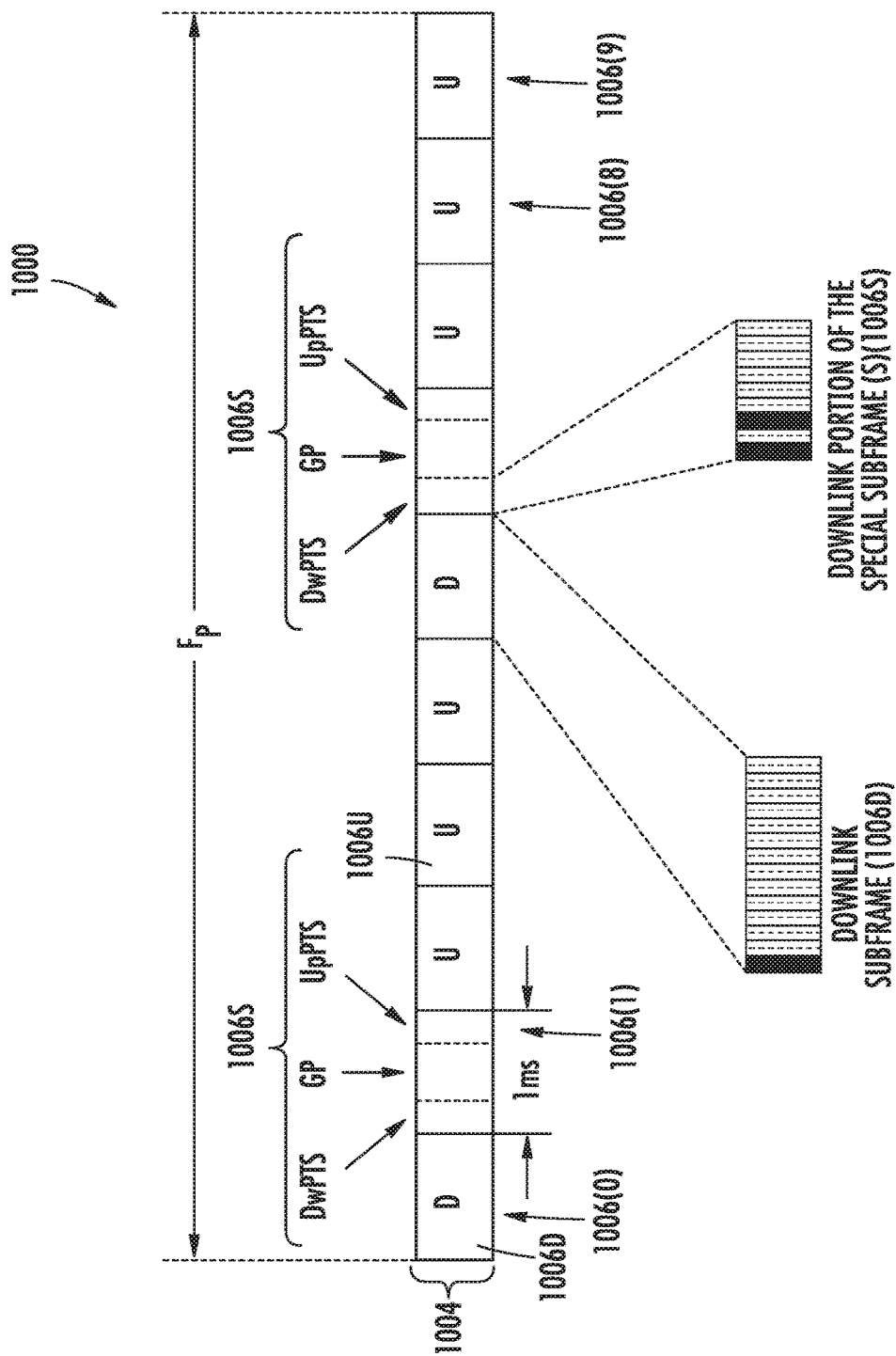
FIG. 10 is a schematic diagram of an exemplary Long Term Evolution (LTE) TDD frame having a specific uplink/downlink TDD frame configuration.

An example of an LTE TDD frame 1000 is illustrated in FIG. 10 as an example according to one uplink/downlink LTE TDD frame configuration. Examples of different uplink/downlink LTE TDD frame configurations 1102 are illustrated in FIG. 11, which are described in more detail below. Each of the uplink/downlink LTE TDD frame configurations 1102 provide a different configuration of downlink frame periods and uplink frame periods. Thus, by detecting the particular uplink/downlink LTE TDD frame configuration being employed to control the transmission timing of the received downlink TDD communications signal 106D, the TDD period control circuit 402 in the central unit 104 in FIG. 4 can be configured to synchronize transmission of the uplink TDD communications signals 106U based on the recognized timing patterns of the detected uplink/downlink LTE TDD frame configuration. In this manner, the TDD period control circuit 402 can synchronize transmission of the uplink TDD communications signals 106U to avoid or reduce data loss, as previously discussed above.

With reference to FIG. 10, one exemplary uplink/downlink LTE TDD frame configuration is illustrated. FIG. 10 illustrates LTE TDD frame 1004. In this embodiment, the LTE TDD frame 1004 is designated to be transmitted over a frame period Fp, which in this example is a ten (10) millisecond (ms) time period. The LTE TDD frame 1004 is comprised of ten (10) LTE TDD sub-frames 1006(0)-1006(9) comprised of time slots or periods of one (1) ms in duration each. Each LTE TDD sub-frame 1006(0)-1006(9) is designated as a downlink LTE TDD sub-frame 1006D, an uplink LTE TDD sub-frame 1006U, or an LTE TDD special sub-frame 1006S according to the uplink/downlink LTE TDD frame configuration of the LTE TDD frame 1004. The downlink LTE TDD sub-frames 1006D designate downlink frame periods where downlink LTE TDD data is designated to be transmitted. The uplink LTE TDD sub-frames 1006U designate uplink LTE TDD frame periods where uplink LTE TDD data is designated to be transmitted. The LTE TDD special sub-frame 1006S designates a special frame period where a transition is designated to occur from a downlink LTE TDD frame period to an uplink LTE TDD frame period, or vice versa. The LTE TDD special sub-frame 1006S is comprised of pilot timeslot DwPTS, a guarded period GP, and uplink pilot timeslot UpPTS. The GP designates a frame period where no downlink or uplink TDD communications should occur as setup time for a transition downlink LTE TDD frame period to an uplink LTE TDD frame period in the LTE TDD frame 1004, or vice versa.

FIG. 11 is a table 1102 illustrating different uplink/downlink LTE TDD frame configurations 1102 that can be detected to synchronize LTE TDD uplink TDD communications transmissions from TDD communications circuits, such as the central unit 104 and remote units 114(1)-114(N) in FIG. 4, based on the detected LTE TDD frame configuration in an LTE TDD frame controlling the transmission timing of a downlink LTE TDD communications signal. In this regard, seven (7) unique uplink/downlink LTE TDD frame configurations 1102(0)-1102(6) are provided for an exemplary LTE TDD frame 1004 in FIG. 11. The downlink-to-uplink switch-point periodicities 1104(0)-1104(6) are shown with each uplink/downlink LTE TDD frame configuration 1102(0)-1102(6), and are either five (5) ms or ten (10) ms. A downlink-to-uplink switch-point periodicity 1104 is the duration in which a switch should have occurred in the LTE TDD frame 1004 for a given uplink/downlink LTE TDD frame configuration 1102 from a downlink LTE TDD frame period or an uplink LTE TDD frame period.

Figure 12:
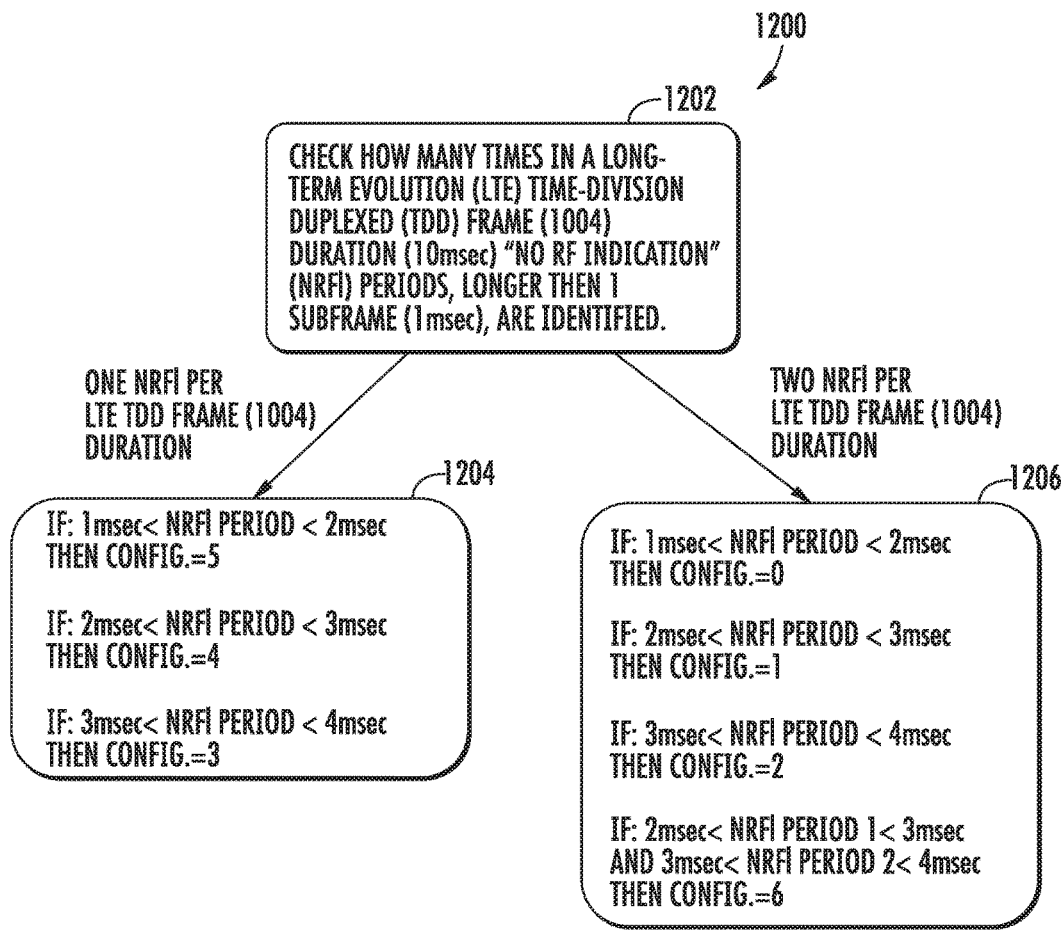
FIG. 12 is a flowchart illustrating an exemplary process for detecting uplink/downlink LTE TDD frame configurations in LTE TDD communications signals from an LTE TDD signal source that can be employed in the process illustrated in FIG. 8A and for synchronizing LTE TDD uplink communications transmissions from LTE TDD communications circuits to an LTE TDD signal source in an LTE TDD distributed antenna system based on the detected LTE TDD frame configuration that can be performed in the process illustrated in FIG. 8B.

With continuing reference to FIGS. 10 and 11, note that for each different LTE TDD sub-frame 1006(0)-1006(9) for each of the uplink/downlink LTE TDD frame configurations 1102(0)-1102(6), knowledge of whether there is one (1) or two (2) LTE TDD sub-frames 1006 in the LTE TDD frame 1004 having no downlink TDD communication (RF) indication (i.e., signal) (NRFI) designation can be used to distinguish between uplink/downlink LTE TDD frame configurations. As discussed above and illustrated in FIG. 10, each LTE TDD special sub-frame 1006S includes an NRFI period of less than one (1) millisecond ms. Thus, if the downlink TDD communications signal 106D monitored by the power detector circuit 416 in FIG. 4 provides an NRFI of one LTE TDD sub-frame 1006 per LTE TDD frame 1004, the uplink/downlink LTE TDD frame configuration of the monitored downlink TDD communications signal 106D is known to be either uplink/downlink LTE TDD frame configuration 3 (1102(3)), 4 (1102(4)), or 5 (1105(5)), as shown in FIG. 11. If the downlink TDD communications signal 106D monitored by the power detector circuit 416 provides an NRFI of two LTE TDD sub-frames 1006 per LTE TDD frame 1004, the particular uplink/downlink LTE TDD frame configuration 1102 of the monitored downlink TDD communications signal 106D is known to be either uplink/downlink LTE TDD frame configuration 0 (1102(0)), 1 (1102(1)), 2 (1102(2)), or 6 (1102(6)), as shown in FIG. 11. This is illustrated in FIG. 12, discussed below.

The table below illustrates the LTE TDD special sub-frame 1006S configurations in one example for the LTE TDD frame 1004. This table shows the duration of the fields (DwPTS, GP, and UpPTS) for the LTE TDD special sub-frame 1006S. The duration of each field of the LTE TDD special sub-frame 1006S is given in symbols. However, other LTE TDD special sub-frame 1006S configurations may be provided in the TDD signal source 112 by an operator based on the expected proportion between adjacent base stations.

TABLE 1

Exemplary LTE TDD Special (S) Sub-frame Configurations

| Special subframe configuration | Extended cyclic prefix length in OFDM symbols | | | Normal cyclic prefix length in OFDM symbols | | |
| --- | --- | --- | --- | --- | --- | --- |
| | DwPTS | GP | UpPTS | DwPTS | GP | UpPTS |
| 0 | 3 | 8 | 1 | 3 | 10 | 1 |
| 1 | 8 | 3 | | 9 | 4 | |
| 2 | 9 | 2 | | 10 | 3 | |
| 3 | 10 | 1 | | 11 | 2 | |
| 4 | 3 | 7 | 2 | 12 | 1 | |
| 5 | 8 | 2 | | 3 | 9 | 2 |
| 6 | 9 | 1 | | 9 | 3 | |

TABLE 1-continued

Exemplary LTE TDD Special (S) Sub-frame Configurations

| Special subframe configuration | Extended cyclic prefix length in OFDM symbols | | | Normal cyclic prefix length in OFDM symbols | | |
|---|---|---|---|---|---|---|
| | DwPTS | GP | UpPTS | DwPTS | GP | UpPTS |
| 7 | — | — | — | 10 | 2 | |
| 8 | — | — | — | 11 | 1 | |
| | Total = 12 symbols Symbol = 83.4 usec | | | Total = 14 symbols Symbol = 71.4 usec | | |

As one example, for the TDD period control circuit 402 in FIG. 4 to detect the NRFI period, the TDD period control circuit 402 may assume that the entire LTE TDD special sub-frame 1006S, excluding a predefined period of time, is in the downlink LTE TDD frame period. For example, the predefined period of time for the LTE TDD frame 1004 may be 142 ms, which is 0.8 microseconds (μs) less than the duration of two UpPTS signals in the LTE TDD special sub-frame 1006S (see FIG. 11). This predefined period of time also allows enough time for the reception of the UpPTS signal while providing for the downlink TDD communications signal 106D to be fully transmitted in all LTE TDD special sub-frame 1006S configurations. Thus, as another example, when the TDD period control circuit 402 creates a TDD timing frame pattern to synchronize transmission of the uplink TDD communications signal 106U, a time advance representing the time for the uplink frame period to transition to the downlink frame period in the uplink TDD communications signal 106U may be added to the TDD frame timing pattern. For example, for uplink/downlink TDD frame configuration 4 (1102(4)) in FIG. 11, the TDD frame timing pattern may provide for 7.858 ms for the downlink LTE TDD frame period (i.e., seven (7) downlink LTE TDD sub-frames 1006D plus one (1) LTE TDD special sub-frame 1006S, minus 142 ms), and 2.142 ms for the downlink LTE TDD frame period (i.e., two (2) uplink LTE TDD sub-frames 1006U plus 142 ms).

FIG. 12 is a flowchart 1200 illustrating an exemplary process for detecting uplink/downlink LTE TDD frame configurations in an LTE TDD frame for the downlink TDD communications signal 106D that can be employed in block 808 in the exemplary process illustrated in FIG. 8A previously described above. The exemplary process in FIG. 12 can be employed to detect the uplink/downlink LTE TDD frame configuration 1102 in a downlink TDD communications signal 106D according to the uplink/downlink LTE TDD frame configurations 1102(0)-1102(6) in FIG. 11 in particular. In this regard, the TDD period control circuit 402 in FIG. 4 can be configured to check how many times in an LTE TDD frame 1004, an NRFI period of more than one (1) ms is identified (block 1202). If one (1) NRFI exists in the LTE TDD frame 1004, the uplink/downlink LTE TDD frame configuration of the monitored downlink TDD communications signal 106D is known to be either uplink/downlink LTE TDD frame configuration 3 (1102(3)), 4 (1102(4)), or 5 (1102(5)), as shown in FIG. 11. If two (2) NRFI periods exist in the LTE TDD frame 1004, the particular uplink/downlink LTE TDD frame configuration 1102 of the monitored downlink TDD communications signal 106D is known to be either uplink/downlink LTE TDD frame configuration 0 (1102(0)), 1 (1102(1)), 2 (1102(2)), or 6 (1102(6)), as shown in FIG. 11.

With continuing reference to FIG. 12, block 1204 provides further processing to determine the specific uplink/downlink LTE TDD frame configuration for scenarios of one (1) NRFI existing in the LTE TDD frame 1004. In this regard, if an NRFI period is greater than one (1) ms and less than two (2) ms, the particular uplink/downlink LTE TDD frame configuration 1102 of the monitored downlink TDD communications signal 106D is known to be uplink/downlink LTE TDD frame configuration 5 (1102(5)) (block 1204). If the NRFI period is greater than two (2) ms and less than three (3) ms, the particular uplink/downlink LTE TDD frame configuration 1102 of the monitored downlink TDD communications signal 106D is known to be uplink/downlink LTE TDD frame configuration 4 (1102(4)) (block 1204). If the NRFI period is greater than three (3) ms and less than four (4) ms, the particular uplink/downlink LTE TDD frame configuration 1102 of the monitored downlink TDD communications signal 106D is known to be uplink/downlink LTE TDD frame configuration 3 (1102(3)) (block 1204).

With continuing reference to FIG. 12, block 1206 provides further processing to determine the specific uplink/downlink LTE TDD frame configuration for scenarios of two (2) NRFI existing in the LTE TDD frame 1004. In this regard, if the NRFI period is greater than one (1) ms and less than two (2) ms, the particular uplink/downlink LTE TDD frame configuration 1102 of the monitored downlink TDD communications signal 106D is known to be uplink/downlink LTE TDD frame configuration 0 (1102(0)) (block 1206). If the NRFI period is greater than two (2) ms and less than three (3) ms, the particular uplink/downlink LTE TDD frame configuration 1102 of the monitored downlink TDD communications signal 106D is known to be uplink/downlink LTE TDD frame configuration 1 (1102(1)) (block 1206). If the NRFI period is greater than three (3) ms and less than four (4) ms, the particular uplink/downlink LTE TDD frame configuration 1102 of the monitored downlink TDD communications signal 106D is known to be uplink/downlink LTE TDD frame configuration 2 (1102(2)) (block 1204). If one NRFI period is greater than two (2) ms and less than three (3) ms, and the second NRFI period is greater than three (3) ms and less than four (4) ms, the particular uplink/downlink LTE TDD frame configuration 1102 of the monitored downlink TDD communications signal 106D is known to be uplink/downlink LTE TDD frame configuration 6 (1102(6)) (block 1206).

The TDD communications circuits disclosed herein, including those provided in the TDD signal source 112, the central unit 104, and the remote units 114(1)-114(N) in the TDD DCS 100 in FIG. 4, may be capable of providing and supporting any type of TDD communications services and/or other communications services beyond TDD communication services. The TDD communications circuits may support other RF communications services, which may include, but are not limited to, US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink), medical telemetry frequencies, WLAN, WiMax, WiFi, Digital Subscriber Line (DSL), and LTE, etc.

Figure 13:
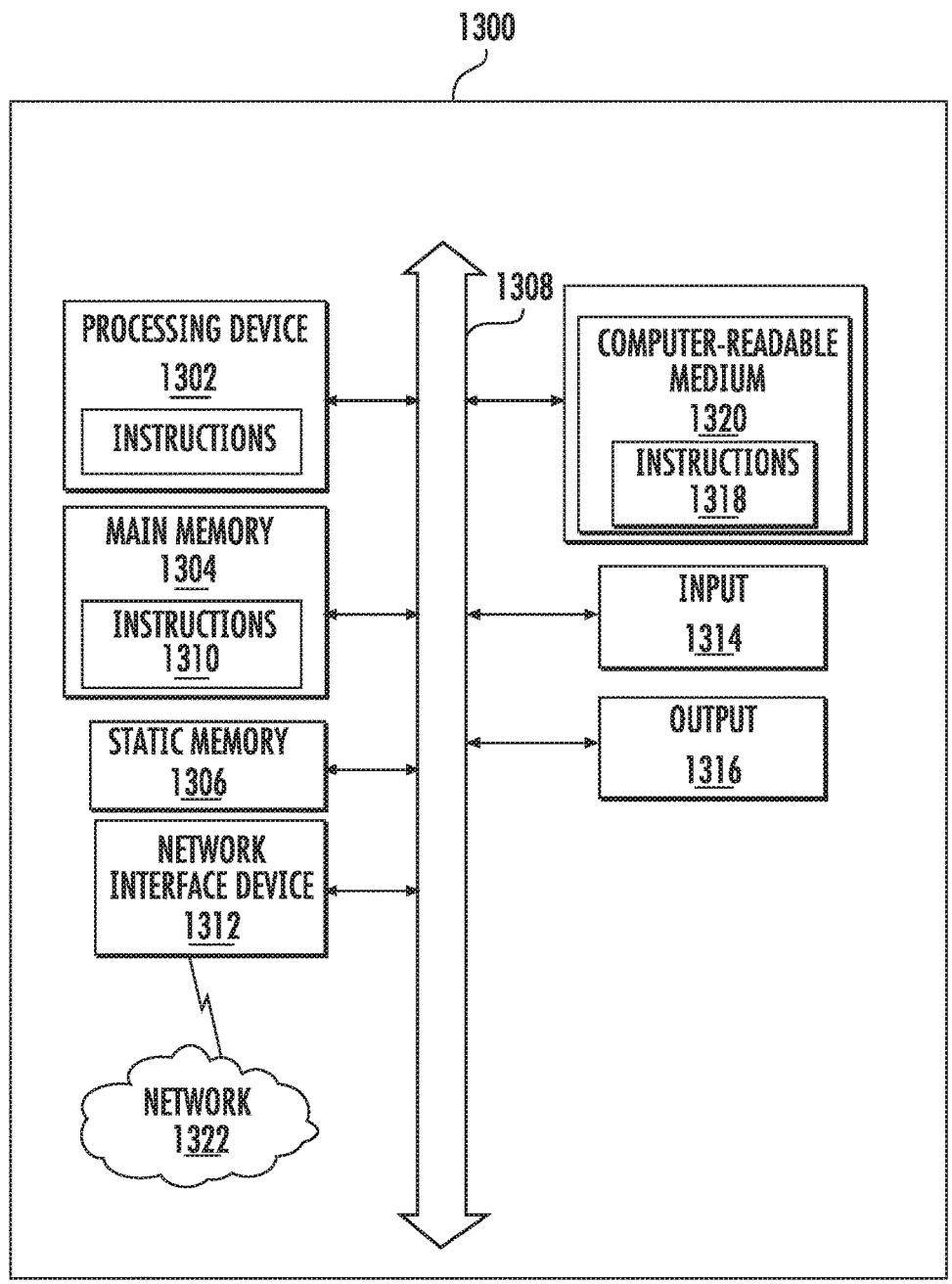
FIG. 13 is a schematic diagram of a representation of an exemplary computer system that can be included in or interface with any of the TDD communications equipment and/or circuits described herein, wherein the exemplary computer system is adapted to execute instructions from an exemplary computer-readable media.

Any of the TDD communications circuits and components disclosed herein can include a computer system. In this regard, FIG. 13 is a schematic diagram representation of additional detail regarding an exemplary form of an exemplary computer system 1300 that is configured to execute instructions from an exemplary computer-readable medium to perform synchronized transmission of uplink TDD communications signals over a communications medium with transmission of downlink TDD communications signals over the communications medium. The computer system 1300 may be a controller. The computer system 1300 can be included in any TDD communications circuit.

In this regard, with reference to FIG. 13, the computer system 1300 includes a set of instructions for causing the distributed antenna system component(s) to provide its designed functionality. The DCS component(s) may be connected (e.g., networked) to other machines in a LAN, an intranet, an extranet, or the Internet. The distributed antenna system component(s) may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The distributed antenna system component(s) may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer. The exemplary computer system 1300 in this embodiment includes a processing device or processor 1302, a main memory 1304 (e.g., read-only memory (ROM), flash memory, dynamic random access memory (DRAM) such as synchronous DRAM (SDRAM), etc.), and a static memory 1306 (e.g., flash memory, static random access memory (SRAM), etc.), which may communicate with each other via a data bus 1308. Alternatively, the processing device 1302 may be connected to the main memory 1304 and/or static memory 1306 directly or via some other connectivity means. The processing device 1302 may be a controller, and the main memory 1304 or static memory 1306 may be any type of memory.

The processing device 1302 represents one or more general-purpose processing devices such as a microprocessor, central processing unit, or the like. More particularly, the processing device 1302 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1302 is configured to execute processing logic in instructions 1310 for performing the operations and steps discussed herein.

The computer system 1300 may further include a network interface device 1312. The computer system 1300 also may or may not include an input 1314 to receive input and selections to be communicated to the computer system 1300 when executing instructions. The computer system 1300 also may or may not include an output 1316, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 1300 may or may not include a data storage device that includes instructions 1318 stored in a computer-readable medium 1320. The instructions 1318 may also reside, completely or at least partially, within the main memory 1304 and/or within the processing device 1302 during execution thereof by the computer system 1300, the main memory 1304 and the processing device 1302 also constituting computer-readable medium. The instructions 1318 may further be transmitted or received over a network 1322 via the network interface device 1312.

While the computer-readable medium 1320 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic medium, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage medium, optical storage medium, flash memory devices, etc.).

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

We claim:

1. A time-division duplexed (TDD) detection circuit, comprising:
a power detector circuit configured to:
detect a power level in a TDD communications signal; and
generate a power level signal indicating the detected power level in the TDD communications signal; and
a processing circuit configured to:
sample the power level signal at a sampling rate into a plurality of power level samples;
divide the plurality of power level samples into a plurality of power level sample blocks;
determine an average power level in each of the plurality of power level sample blocks;
determine a power level sample block among the plurality of power level sample blocks having a lowest average power level; and
generate a threshold power level signal indicating a threshold power level based on the average power level in the power level sample block determined to have the lowest average power level.

2. The TDD detection circuit of claim 1, further comprising:
a TDD communications signal input configured to receive the TDD communications signal; and
wherein:
the power detector circuit comprises a power detector input communicatively coupled to the TDD communications signal input, and a power detector output, the power detector circuit configured to:
detect the power level in the TDD communications signal on the TDD communications signal input; and
generate the power level signal on the power detector output indicating the detected power level in the TDD communications signal; and
the processing circuit comprising a processing circuit input communicatively coupled to the power detector output and a processing circuit output, the processing circuit configured to:
sample the power level signal on the processing circuit input at the sampling rate into the plurality of power level samples; and
generate the threshold power level signal indicating the threshold power level on the processing circuit output based on the power level sample block determined to have the lowest average power level.

3. The TDD detection circuit of claim 1, further comprising a storage circuit configured to store the threshold power level based on the threshold power level signal.

4. The TDD detection circuit of claim 1, further comprising a comparator circuit configured to:
compare the threshold power level signal with a detected power level signal in the TDD communications signal; and
generate a comparator output signal indicating a difference between the threshold power level signal and the detected power level signal in the TDD communications signal.

5. The TDD detection circuit of claim 1, wherein a TDD communications signal interface comprises a communications interface configured to receive a downlink TDD communications signal.

6. The TDD detection circuit of claim 1, wherein:
the power detector circuit is configured to generate the power level signal comprising a power level voltage signal indicating the detected power level in the TDD communications signal; and
the processing circuit is configured to:
sample the power level voltage signal at the sampling rate into the plurality of power level samples comprising a plurality of power level voltage samples;
divide the plurality of power level voltage samples into the plurality of power level sample blocks;
determine the power level sample block among the plurality of power level sample blocks having the lowest average power level; and
generate the threshold power level signal comprising a threshold power level voltage signal based on the average power level in the power level sample block determined to have the lowest average power level.

7. The TDD detection circuit of claim 1, wherein:
the processing circuit is further configured determine a maximum power level in the TDD communications signal; and
the processing circuit is configured to generate the threshold power level signal indicating the threshold power level based on a difference between the average power level in the power level sample block determined to have the lowest average power level and the determined maximum power level.

8. The TDD detection circuit of claim 7, wherein the processing circuit is configured to generate the threshold power level signal indicating the threshold power level as: approximately half of the difference between the average power level in the power level sample block determined to have the lowest average power level and the determined maximum power level, added to the average power level in the power level sample block determined to have the lowest average power level.

9. The TDD detection circuit of claim 1, wherein the processing circuit is configured to sample the power level signal at the sampling rate less than a symbol rate of the TDD communications signal into the plurality of power level samples.

10. The TDD detection circuit of claim 1, wherein the sampling rate is approximately 50 microseconds (μs) and a symbol rate is either approximately 71.4 μs or 83.3 μs.

11. The TDD detection circuit of claim 1, wherein a number of plurality of power level sample blocks is at least twice a number of radio sub-frames in the TDD communications signal.

12. The TDD detection circuit of claim 1, wherein a number of the plurality of power level sample blocks is 20 and a number of radio sub-frames in the TDD communications signal is 10.

13. The TDD detection circuit of claim 1, wherein a number of the plurality of power level sample blocks is 20 and a number of power level samples in each power level sample block among the plurality of power level sample blocks is 10.

14. A method of determining a threshold power level for distinguishing between downlink and uplink periods in a time-division duplexed (TDD) communications signal, comprising:
(a) generating a power level signal indicating a detected power level in the TDD communications signal;
(b) sampling the power level signal at a sampling rate into a plurality of power level samples;
(c) dividing the plurality of power level samples into a plurality of power level sample blocks;
(d) determining an average power level in each of the plurality of power level sample blocks;
(e) determining a power level sample block among the plurality of power level sample blocks having a lowest average power level; and
(f) generating a threshold power level signal indicating a threshold power level based on the average power level in the power level sample block determined to have the lowest average power level.

15. The method of claim 14, further comprising detecting a power level in the TDD communications signal.

16. The method of claim 14, further comprising storing the threshold power level indicated by the threshold power level signal.

17. The method of claim 14, further comprising:
comparing the threshold power level signal with a detected power level signal in the TDD communications signal; and
generating a comparator output signal indicating a difference between the threshold power level signal and the detected power level signal in the TDD communications signal.

18. The method of claim 14, further comprising:
determining a maximum power level in the TDD communications signal; and
generating the threshold power level signal comprising generating the threshold power level signal indicating the threshold power level based on a difference between the average power level in the power level sample block determined to have the lowest average power level and the determined maximum power level.

19. The method of claim 18, wherein generating the threshold power level signal indicating the threshold power level comprises:
determining the difference between the average power level in the power level sample block determined to have the lowest average power level and the determined maximum power level;
dividing the determined difference by approximately half to provide a divided difference;
adding the average power level in the power level sample block determined to have the lowest average power level to the divided difference to provide the threshold power level signal.

20. The method of claim 14, comprising sampling the power level signal at the sampling rate less than a symbol rate of the TDD communications signal into the plurality of power level samples.

21. The method of claim 14, wherein a number of plurality of power level sample blocks is at least twice a number of radio sub-frames in the TDD communications signal.

22. The method of claim 14, comprising repeatedly performing steps (a)-(f).

* * * * *